United States Patent [19]
Chang et al.

[11] Patent Number: 5,446,578
[45] Date of Patent: Aug. 29, 1995

[54] POLARIZATION PRESERVING OPTICAL ISOLATOR

[75] Inventors: Kok W. Chang, Sunnyvale; Wayne Sorin, Mountain View, both of Calif.

[73] Assignee: Hewlett-Packard Company, Palo Alto, Calif.

[21] Appl. No.: 327,945

[22] Filed: Mar. 23, 1989

Related U.S. Application Data

[63] Continuation-in-part of Ser. No. 222,597, Jul. 21, 1988, Pat. No. 4,974,944.

[51] Int. Cl.$^6$ ............................................. G02B 5/30
[52] U.S. Cl. ...................... 359/282; 359/484; 359/495; 359/496; 359/497; 372/703
[58] Field of Search ............... 350/375, 376, 377, 378, 350/388, 400, 401, 403; 359/250, 256, 282, 484, 494, 495, 496, 497, 499; 372/703

[56] References Cited

U.S. PATENT DOCUMENTS

| | | | |
|---|---|---|---|
| 3,719,414 | 3/1973 | Wentz | 350/403 |
| 4,178,073 | 12/1979 | Uchida et al. | 350/375 |
| 4,239,329 | 12/1980 | Matsumoto | 359/497 |
| 4,375,910 | 3/1983 | Seki | 350/375 |
| 4,548,478 | 10/1985 | Shirasaki . | |
| 4,712,880 | 12/1987 | Shirasaki | 350/377 |
| 4,974,944 | 12/1990 | Chang | 350/403 |

FOREIGN PATENT DOCUMENTS

| | | | |
|---|---|---|---|
| 1327350 | 5/1978 | Japan . | |
| 0113020 | 9/1980 | Japan | 350/400 |
| 0024314 | 3/1981 | Japan | 359/484 |
| 0100410 | 3/1982 | Japan | 359/484 |
| 0022026 | 2/1984 | Japan | 350/400 |
| 0044021 | 3/1984 | Japan | 359/484 |
| 0176721 | 10/1984 | Japan | 350/403 |
| 0176721 | 10/1984 | Japan | 350/403 |
| 0130934 | 7/1985 | Japan | 350/375 |
| 0121027 | 6/1986 | Japan | 350/394 |
| 63-244015 | 10/1988 | Japan | 350/401 |
| 0020521 | 1/1989 | Japan | 359/484 |

OTHER PUBLICATIONS 0121027 061986jpx 350 394 63Matsumoto, "Polarization-Independent Isolators for Fiber Optics", Electronics and Communications in Japan, vol. 62-C, No. 7 1979 pp. 113-118.

*High-Performance Optical Isolator*, Jun. 3, 1987, Fuji Electrochemical Co., Ltd., Tokyo, Japan.

"Compact optical isolator for fibers using birefringent wedges", M. Shirasaki et al., *Applied Optics*, vol. 21, No. 23, 1 Dec. 1982, pp. 4296-4299.

"Optical Isolator for Single Mode Fiber", M. Shirasaki et al, *Digest of European Conference of Optical Communication*, vol. 2.

"Optical Isolation with Ultrahigh Isolation", N. Fukushima, Digest of Annual Meeting of Electronics and Communication Engineers of Japan, 1984, p. 355.

*Primary Examiner*—Ricky D. Shafer

[57] ABSTRACT

At least one non-reciprocal rotation element is interposed between two adjacent walk off crystal members to form an optical isolator. Light in the forward direction is separated into two rays of linear polarizations where there is substantially no optical path length difference between the two rays. Light transmitted in the reverse direction is reduced. A conventional optical isolator which does not preserve optical path length difference is converted into one which does by adding a birefringent plate to compensate for the optical path length difference introduced by the conventional isolator. A pair of collimating lenses may be introduced between any pair of non-reciprocal rotation elements.

20 Claims, 28 Drawing Sheets

FORWARD

REVERSE

COUPLING LOSS: $\cos^2(d_{f1}) * \cos^2(d_{f2})$

ISOLATION: $\sin^2(d_{f1}) * \sin^2(d_{f2})$

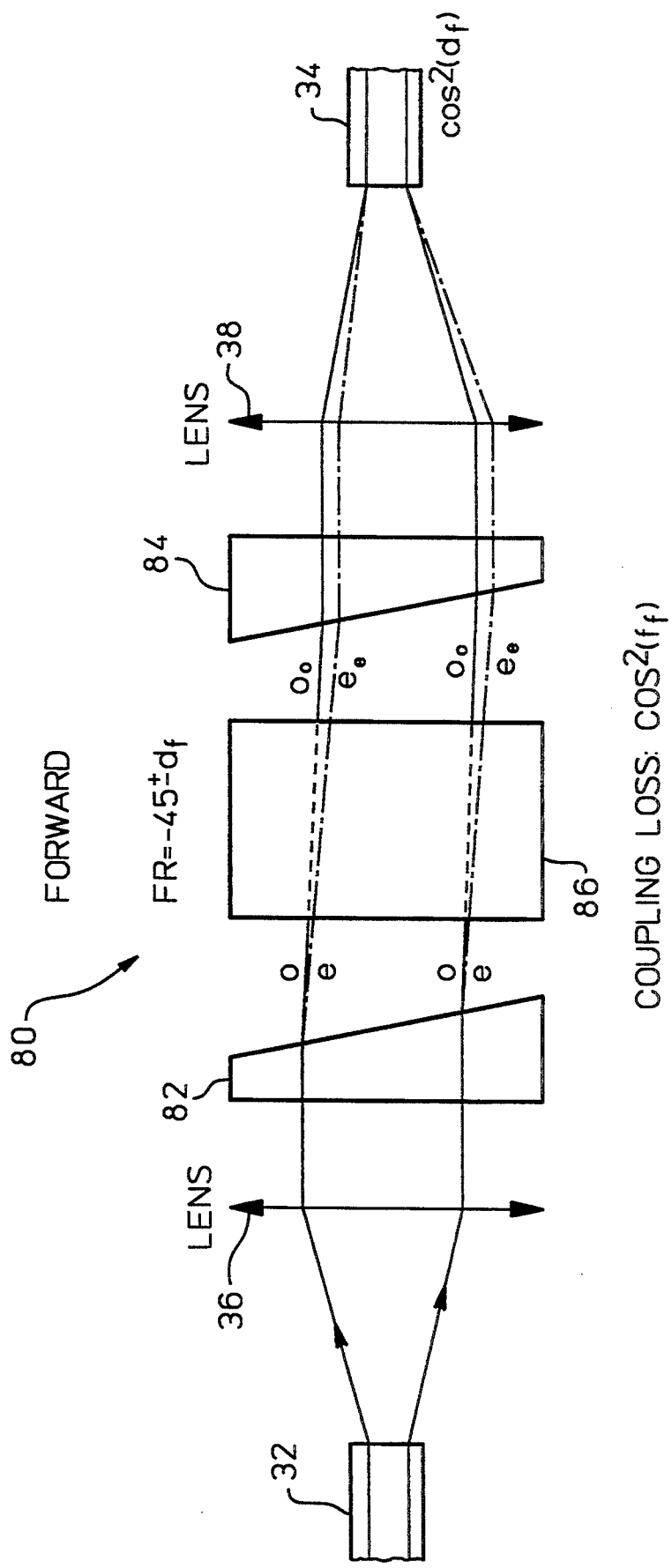

COUPLING LOSS: $COS^2(d_f)$
ISOLATION: $SIN^2(d_f)$

COUPLING LOSS: $COS^2(d_f)$
ISOLATION: $SIN^2(d_f)$

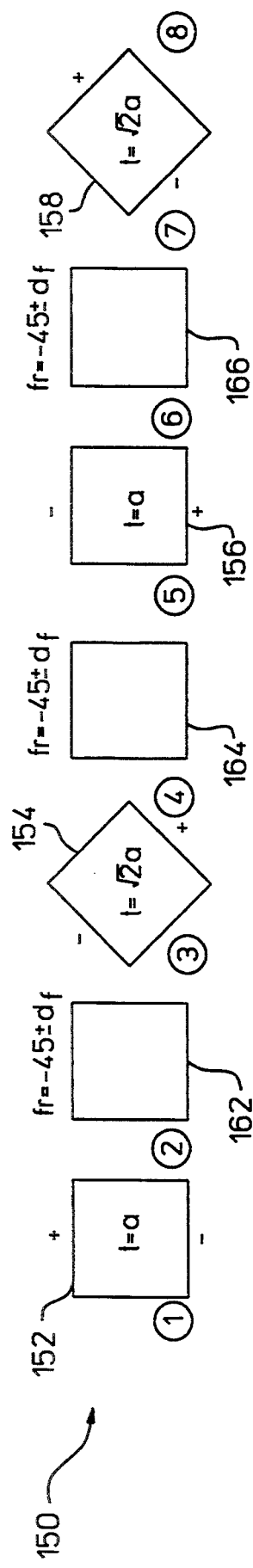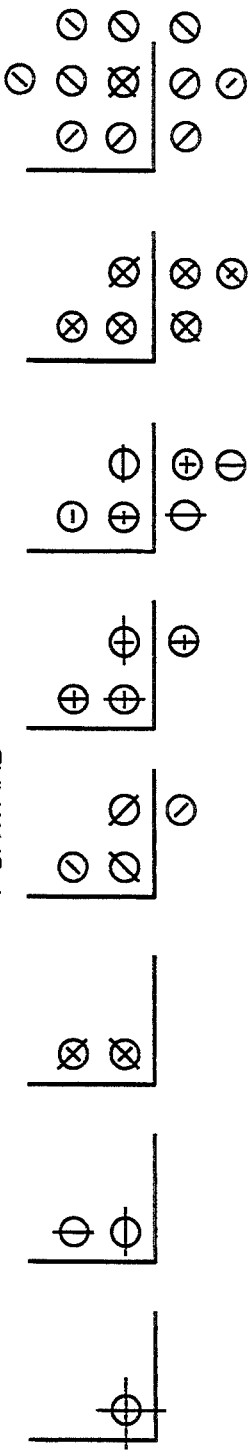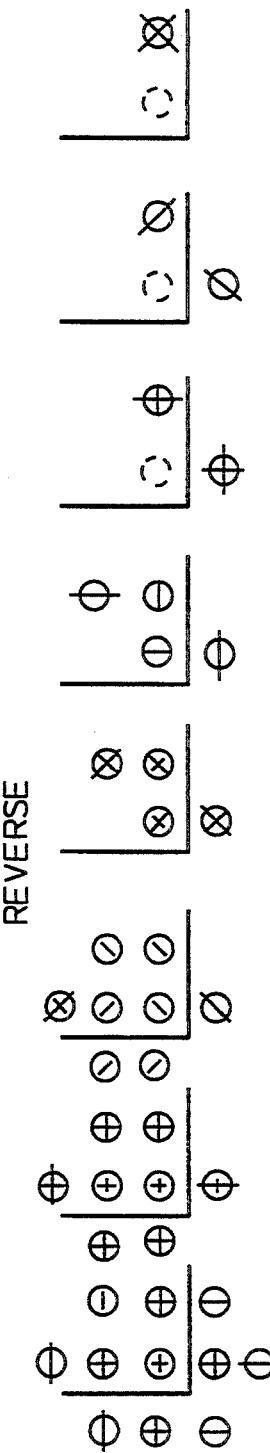
*FIG. 9A* *FIG. 9B* *FIG. 9C*

COUPLING LOSS : $COS^4(d^f)$
ISOLATION : $SIN^4(d^f)$

PATH LENGTH DIFFERRENCE INTRODUCES BY MEMBER 42: $(n_{eff} - n_o)*\sqrt{2}\,a$
PATH LENGTH DIFFERRENCE INTRODUCES BY MEMBER 180: $(n_e - n_o)*T$
ZERO PATH LENGTH DIFFERENCE AT POSITION 6 MEANS: $(n_{eff} - n_o)*\sqrt{2}\,a = (n_e - n_o)*T$
FOR RUTILE AT 1.3 um : $n_e = 2.72$, $n_o = 2.46$ AND $n_{eff} = 2.58$

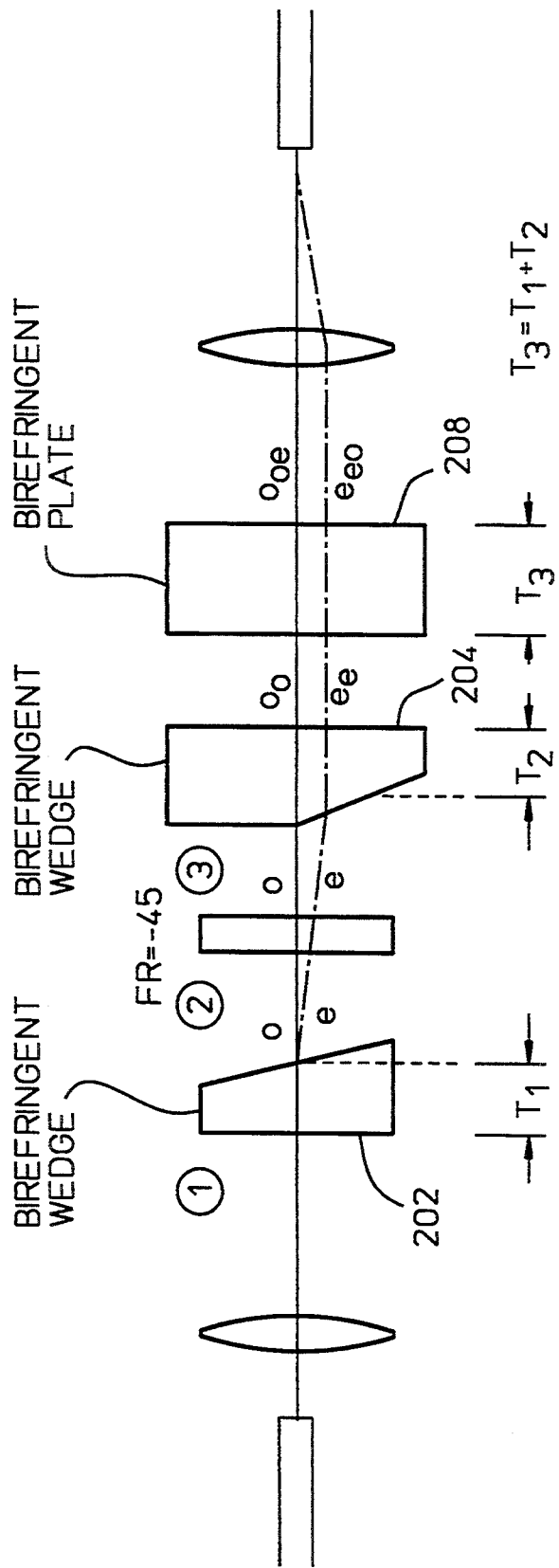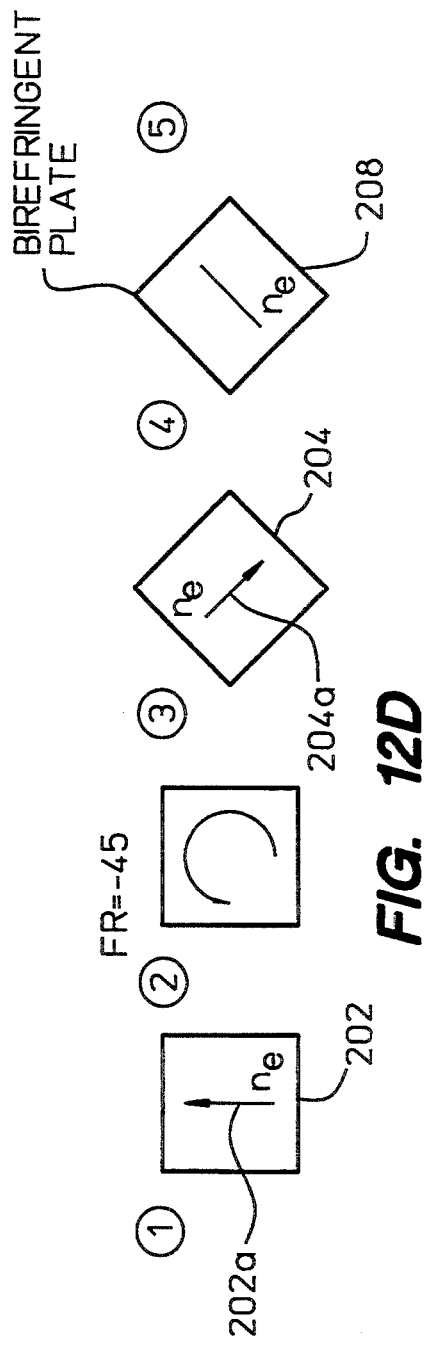
FIG. 12C
FIG. 12D

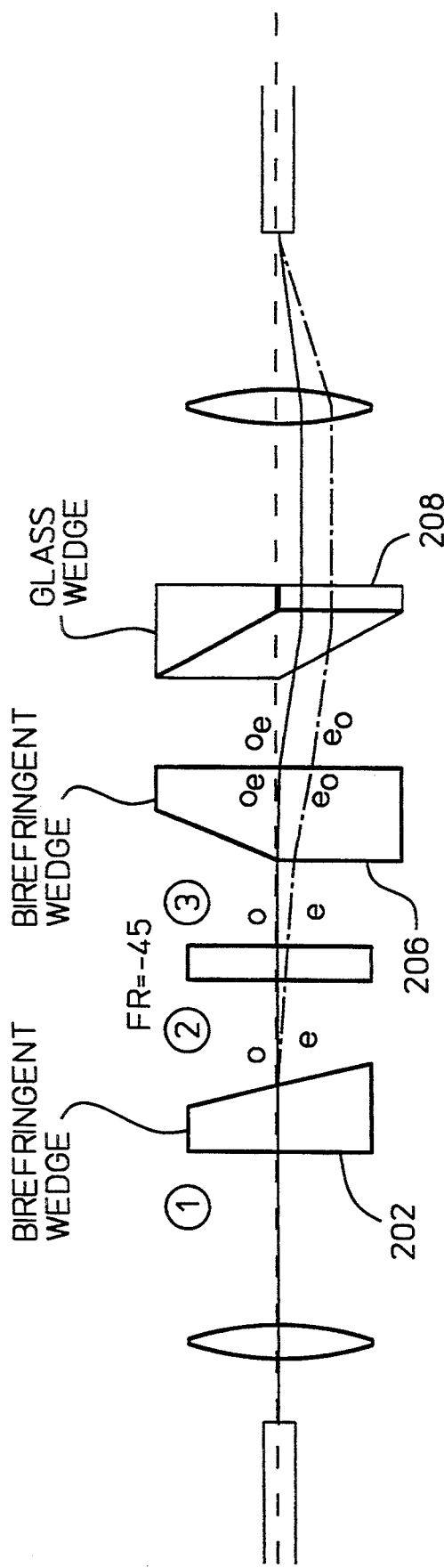
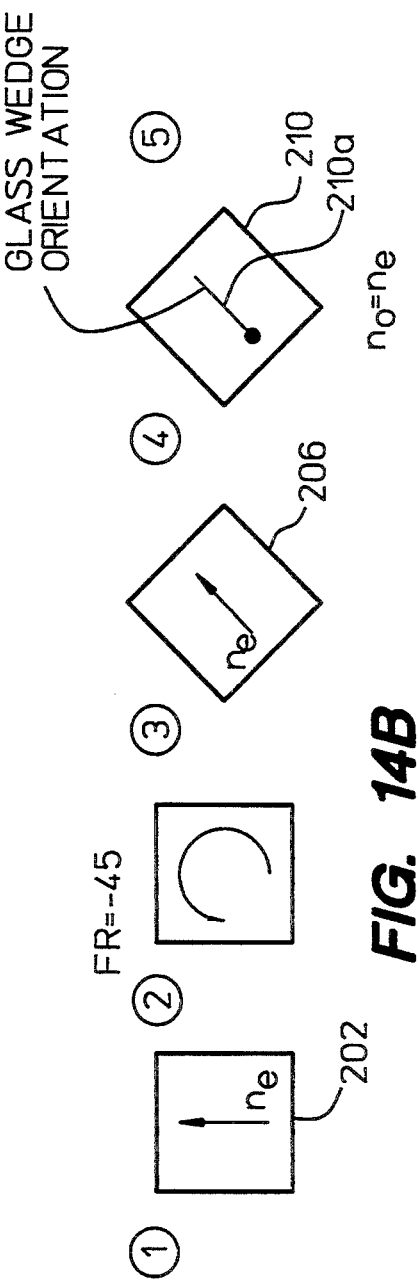
FIG. 14A
FIG. 14B

COUPLING LOSS : $COS^4(d_f) + SIN^4(d_f)$
ISOLATION : $COS^4(d_f) + SIN^4(d_f)$

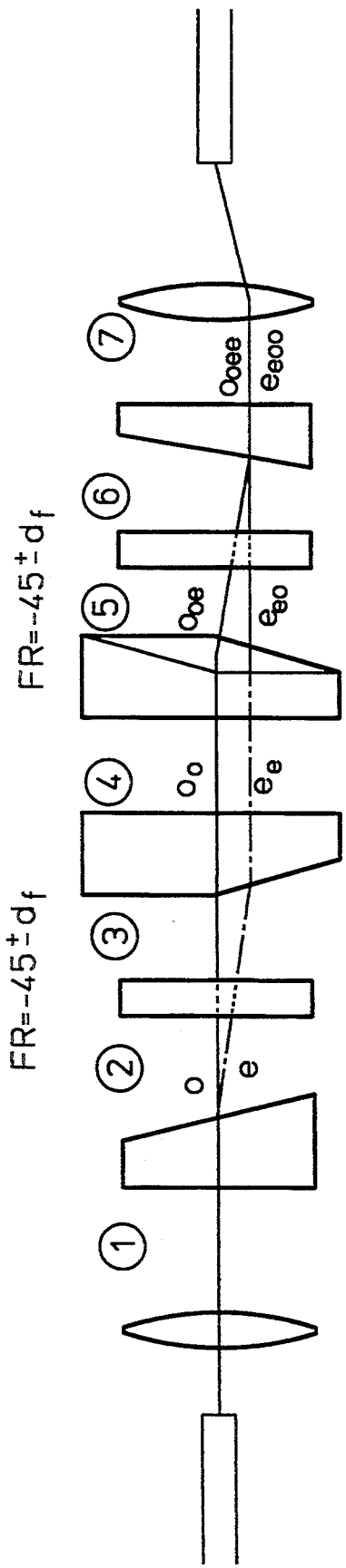
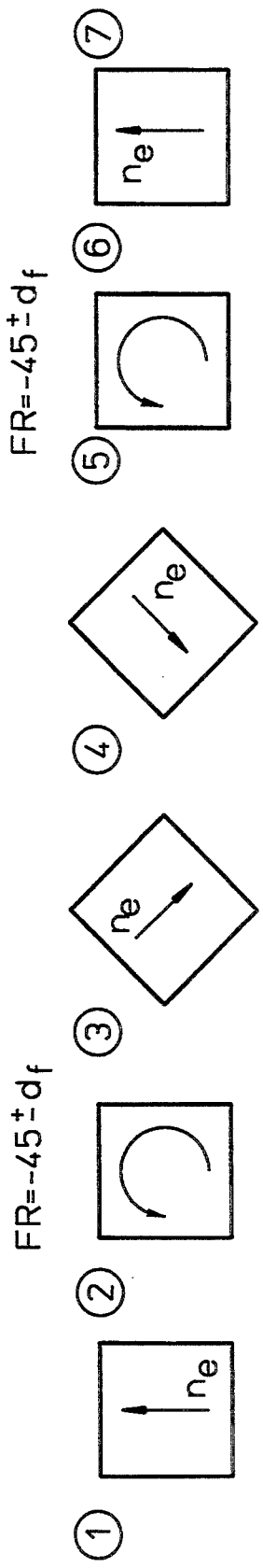
FIG. 19A
FIG. 19B

POLARIZATION PRESERVING OPTICAL ISOLATOR

This application is a continuation in part of application Ser. No. 07/222,597 filed Jul. 21, 1988, which subsequently issued as U.S. Pat. No. 4,974,944 on Dec. 4, 1990.

BACKGROUND OF THE INVENTION

This invention relates in general to polarization independent optical isolators and in particular to optical isolators which preserve the polarization state and the degree of polarization of light.

The use of fiberoptics in communications has developed rapidly in recent years with such progress, new problems have arisen. Thus, when a light source transmits light through an optical fiber to another optical device, the light transmitted through the optical fiber will be reflected by an end face of a fiber or other parts of the optical device at the other end so that such reflected light returns to the light source. Multiple reflections at the end faces of optical fibers or other optical devices can cause echoes. These effects adversely affect the performance of the source and compromise the information communicated in the fiber.

Various optical isolators and non-reciprocal devices have been developed to overcome the problem of light reflections and echoes described above. One such device is described in U.S. Patent application "Improved Optical Nonreciprocal Device" by Kok Wai Chang, Ser. No. 07/222,597, filed Jul. 21, 1988. Such application also describes other, types of prior art optical isolators or optical non-reciprocal devices. The isolator described in the above-referenced application employs walk off crystals. In other isolator designs, birefringent wedges are used, such as in U.S. Pat. No. 4,548,478 to Shirasaki. While the optical isolators described in the above-referenced patent application and patent are effective in overcoming the problem of light reflections or echoes, such devices may give rise to other problems described below.

First it will be useful to define two terms used to describe the polarization of light. The polarization state of a light beam is defined by the magnitude and relative phase of any orthogonal pair of transverse components.

Where a light beam includes a component with a well defined polarization state and another component which is unpolarized light, the beam is said to have a degree of polarization given by the ratio of the power of the polarized light beam to the total power, which is the sum of the power of the polarized and unpolarized components of the beam.

Various lasers have been used for many purposes including communications and optical instruments. It is known that light from a laser will retain its polarization purity or coherence for a set distance characteristic of the laser where the distance is known as the coherent length of the laser. Thus, by definition, the output polarization state of the laser will remain the same within its coherent length.

The isolators described in the above identified application and patent are polarization independent isolators which are isolators which provide the same power light output irrespective of the polarization state or degree of polarization of the input light signal. This type of isolators has the advantage of eliminating the polarization dependent from mission of the light traveling in the forward direction.

When an optical isolator of any one of the types described in the above-referenced application or patent is used to reduce reflections when a beam is passed through an optical system, such isolator will introduce certain phase variations between the two polarization paths which may be temperature and wavelength dependent.

An optical isolator of any one of the types described in the above-referenced application or patent typically employs walk off crystals or birefringent wedges. Such crystals or wedges have different indices of refraction along at least two orthogonal axes. In a special case, when an input light beam with a linear polarization substantially parallel to one of the axes of the first walk off crystal or birefringent wedge is passed through any one of such types of isolators, most of the light will pass through each crystal or wedge of such isolator as one beam so that the polarization state and the degree of polarization of the light in the forward direction will be essentially preserved. Thus if a laser having a linear polarization state is passed through an isolator of such types in the above manner, the polarization state and degree of polarization will be preserved.

However, in situations other than the special case described above, an input beam of arbitrary polarization can be projected onto the orthogonal axes of the first walk off crystal or birefringent wedge of any one of- the isolators described in the above-referenced application or patent. And if such beam is passed through the crystal or wedge, such input beam will be separated by such crystal or wedge into an extraordinary ray and an ordinary ray corresponding to the two orthogonal axes having different indices of refraction. Since the two rays experience different indices of refraction through the crystals or wedges in the isolators, the two rays will separate. The isolators described in the above-referenced application or patent achieve optical isolation of reflections by taking advantage of such separation. Thus, an optical isolator would cause the extraordinary and ordinary rays to superpose each other in a forward direction when being transmitted to the desired location but would prevent reflections of the extraordinary and ordinary rays from superposing each other travelling in the reverse direction to overcome the problem of reflections and echoes.

From the above, except for the special case noted above, the input beam will be split into the ordinary and extraordinary rays travelling in the forward direction of the isolator. These two rays will experience different indices of refraction, so that the optical isolator introduces an optical path length difference between the two rays. Therefore, when the two rays superpose at the desired location in the forward direction, there will be an optical path length difference between the two rays. Hence, except for the special case, the above described isolators will introduce optical path length difference between the rays upon superposition.

When an optical isolator is used to reduce reflections in the transmission of laser light, and when the optical path length difference introduced by the isolator is equal to or larger than the coherent length of the laser, the output beam of the isolator can effectively become unpolarized. Even where the optical path length difference introduced by the optical isolator is smaller than the coherent length of the laser, the isolator will still introduce a phase difference between the extraordinary and ordinary rays where the phase difference can be temperature and wavelength dependent. It is therefore desirable to provide an optical isolator whose two optical paths have the same time delay which therefore preserves the polarization state of the light in the forward direction of the isolator. Where the input light is a mixture of polarized and unpolarized light, the polarization preserving optical isolator would preserve also the degree of polarization of the light.

SUMMARY OF THE INVENTION

This invention is directed towards an optical non-reciprocal device for passing light of any polarization in a forward direction from a first point to a second point and for reducing light passing in a reverse direction from the second point to the first point. The device comprises at least two walk off crystal members arranged in a linear array ray for separating light into two rays and at least one non-reciprocal rotation element interposed between two adjacent crystal members. The rotations of the elements and the dimensions and orientations of the crystal members are such that light in both the forward and reverse directions is separated into a first and a second ray of substantially linear polarizations wherein the polarizations of the two rays are substantially orthogonal to each other. In the forward direction the two rays are synthesized (i.e. combined into a single beam) when they arrive at the second point. In the reverse direction the two rays substantially do not superpose each other at the first point, so that light passing in the reverse direction is reduced. The rotations of the elements and the dimensions and orientations of the crystal members are such that there is substantially no optical path length difference between the two rays in the forward direction. The polarization state and the degree of polarization of the light in the forward direction are therefore preserved.

Another aspect of the invention is directed towards an optical non-reciprocal device for passing light in the forward direction from a first point to a second point and for reducing light passing in the reverse direction from the second point to the first point. The device comprises a first, second and third birefringent plate arranged in a sequence and a linear array between the first and second points with a first or second plate between the other two plates for separating light into ordinary and extraordinary rays. The device also includes a non-reciprocal rotation element between the first and second plates rotating the polarization of the light in the forward and reverse directions by substantially 45°. The first and second plates are tapered. The three plates each has an optical axis $n_e$ in the plane of the plate, wherein the optical axis of the second plate is rotated by substantially 45° with respect to that of the first plate and the optical axis of the third plate is substantially orthogonal to that of the second plate. The third plate has a thickness which is substantially equal to the sum of the average thicknesses of the first and second plate. The light in both the forward and reverse directions is separated into a first and a second ray of substantially linear polarizations wherein the polarizations of the two rays are substantially orthogonal to each other. In the forward direction, the two rays are synthesized when they arrive at a second point. In the reverse direction, the two rays substantially do not superpose each other at the first point, so that light passing in the reverse direction is reduced. There is substantially no optical path length difference between the two rays in the forward direction. Therefore, the polarization state and the degree of polarization of the light in the forward direction is preserved.

Yet another aspect of the invention is directed towards an optical reciprocal device for passing light in a forward direction from a first point to a second point and for reducing light passing in a reverse direction from the second point to a first point. The device comprises a first and second tapered birefringent plate between the first and second point. The first plate is closer to the first point than the second plate. The two plates separate light into ordinary and extraordinary rays. The two plates are tapered and have substantially the same average thicknesses and have optical axes $n_o$, $n_e$ in the plane of the plate. The device further comprises a non-reciprocal element between the first and second plates for rotating the polarization of the light in the forward and reverse directions by substantially 45° counterclockwise when viewed in the forward direction. The optical axis $n_e$ of the second plate is rotated by substantially 45° clockwise relative to that of the first member when viewed in the forward direction such that light in both the forward and reverse directions is separated into a first and a second ray of substantially linear polarizations wherein the polarizations of the two rays are substantially orthogonal to each other. Again, in the forward direction the two rays are synthesized and in the reverse direction the two rays are not so that light passing in the reverse direction is reduced. There is substantially no optical path length difference between the two rays in the forward direction to preserve polarization state and degree of polarization. In the preferred embodiment, the device also includes isotropic means placed between the second plate and the second point for coupling light to the second point in the forward direction. Still another embodiment is directed towards a device which is similar to the one described immediately above with slight modifications. The modifications are that the non-reciprocal rotation element rotates the polarization of the light in the forward and the reverse directions by substantially 45° clockwise when viewed in the forward direction instead of counterclockwise and the optical axis $n_e$ of the second plate is rotated by substantially 45° counterclockwise relative to the first member instead of clockwise.

BRIEF DESCRIPTION OF THE DRAWINGS

FIGS. 4A, 4B are schematic views of a prior art isolator in U.S. Pat. 4,548,478 to illustrate the transmission of light in the forward direction.

FIG. 9A are cross-sectional views of seven elements of an array of elements constituting a polarization preserving optical isolator device, where the cross-sectional views are arranged side-by-side in the same order as in the array in the forward direction to illustrate another embodiment of the invention.

FIGS. 9B, 9C illustrate the positions of light rays passing through the optical device of FIG. 9A in the forward and reverse directions, respectively.

FIG. 12C is a side view of an array of elements constituting a polarization preserving optical isolator device employing birefringent wedges and plate to illustrate yet another embodiment of the invention.

FIG. 12D are cross-sectional views of the elements of FIG. 12C arranged side-by-side in the same order as in the array of FIG. 12C in the forward direction.

FIG. 14A is a side view of an array of elements constituting a polarization preserving optical isolator device to illustrate an embodiment of the invention.

FIG. 14B are crosssectional views of four elements of FIG. 14A arranged side-by-side in the same order as in the array of FIG. 14A in the forward direction.

FIG. 19A is a side view of an array of elements constituting a polarization preserving optical isolator device to illustrate still another embodiment of the invention.

FIG. 19B are cross-sectional views of six elements of FIG. 19A, where the cross-sectional views are arranged side-by-side in the same order as in the array of FIG. 19A in the forward direction.

DETAILED DESCRIPTION OF THE INVENTION

Figure 1:
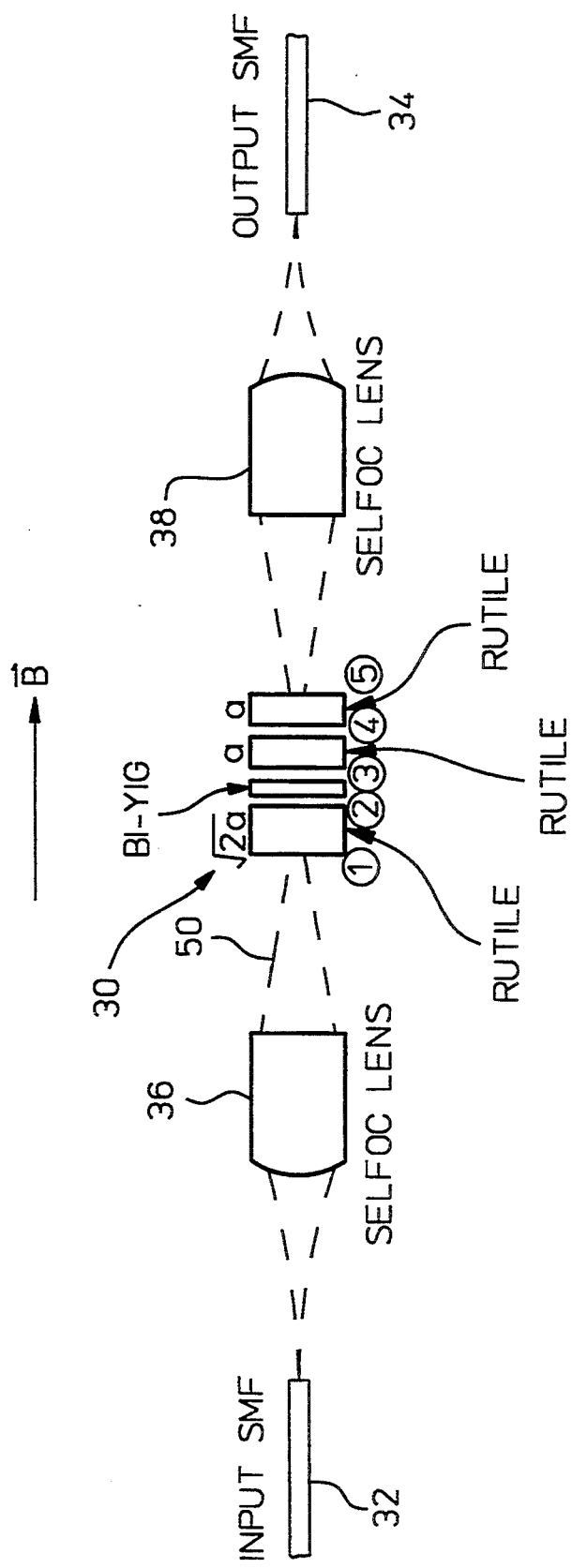
FIG. 1 is a side view of an array of elements constituting an optical isolator to illustrate a conventional optical isolator.

FIG. 1 is a side view of an array of elements forming a conventional polarization independent optical isolator. As shown in FIG. 1, isolator 30 is placed between an input single mode fiber 32 and an output single mode fiber 34, and self focusing lenses 36, 38 for focusing the light between the two fibers and the isolator. Isolator 30 operates to permit transmission of light in the forward direction from fiber 32 to fiber 34. Any light originating or reflecting from fiber 34, however, is greatly reduced in amplitude by isolator 30 when it is transmitted in the reverse direction to input fiber 32. The operation of isolator 30 will be explained in reference to FIGS. 2A–2C below.

Figure 2A:
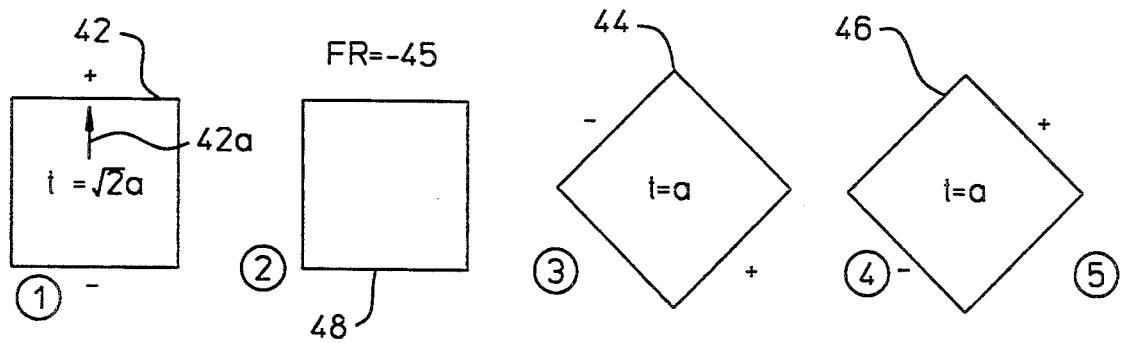
FIG. 2A are cross-sectional views of the four elements of FIG. 1, where the cross-sectional views are arranged side-by-side in the same order as in the array and in the forward direction to illustrate the isolator of FIG. 1.

FIG. 2A are cross-sectional views of elements 42, 48, 44, 46 taken along planes perpendicular to the path of beam 50 in the forward direction of the beam, where the views are arranged in the same order as in the array of FIG. 1 in the forward direction to illustrate the invention. The walk off directions of (walk off crystal) members 42, 44, 46 are shown by the (+) and (−) signs, where the walk off direction for light travelling in the forward direction is from the (−) towards the (+) in the figure. For light travelling in the reverse direction, the walk off direction is from the (+) towards the (−) in the figure. This convention for illustrating the walk off direction will be used throughout the application. As used in this application, a walk off crystal is one which causes rays with their planes of polarization parallel to the walk off direction to walk off in the walk off direction, but which leaves rays with planes of polarization orthogonal to the walk off direction unchanged in direction.

Element 48 is a non-reciprocal rotation element such as a Faraday rotator which rotates the polarization of any light passing therethrough counterclockwise by approximately 45°. This is illustrated in FIG. 2A by the "equation FR=−45", where the (−) sign indicates rotation in the counterclockwise direction and no sign or (+) sign indicates that the rotation is in the clockwise direction when viewed in the forward direction. Again such convention for the direction of rotation will be used throughout the application. Therefore, when viewed in the forward direction, member 44 is rotated by 135° clockwise relative to crystal 42 and crystal 46 is rotated by 45° clockwise relative to crystal 42.

The walk off direction of member 42 in the forward direction is shown by arrow 42a, pointing from the (−) sign towards the (+) sign as shown in FIG. 2A. The walk off directions in the forward direction of members 44, 46 also point from the (−) sign towards the (+) sign.

Figure 2B:
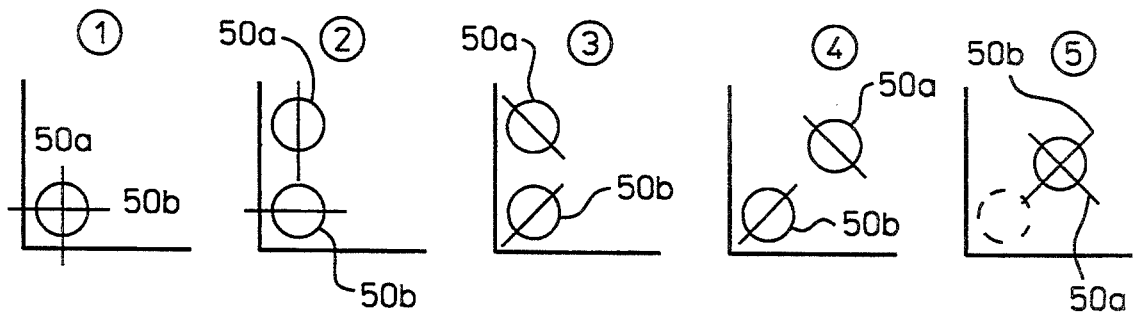
FIGS. 2B, 2C illustrate the positions of side rays passing through the optical isolator of FIGS. 1, 2A in the forward and reverse directions respectively.

In reference to FIG. 1, if beam 50 at position 1 in the forward direction passes through isolator 30 to emerge at position 5. The effect of isolator 30 on beam 50 is illustrated in FIG. 2B. Positions 1 through 5 in FIG. 2B identify the effects on beam 50 of isolator 30 at each stage during the passage of beam 50 and correspond to positions 1 through 5 in FIGS. 2A. As shown in FIG. 2B, beam 50 impinges on member 42 at position 1 and emerges at position 2 into two rays 50a, 50b where ray 50a has a polarization substantially parallel to 42a and ray 50b has a polarization substantially orthogonal to direction 42a. The two rays are rotated by Faraday rotator 48 so that their planes of polarization are as shown in position 3 in FIG. 2B. The two rays then impinge upon member 44 so that ray 50a again diverges so that the positions of the two rays are as illustrated in position 4 in FIG. 2B. Member 46 causes ray 50b to walk off so that the two rays again superpose at position 5. In such manner isolator 30 causes the two rays to superpose each other when emerging from the isolator.

In reference to FIG. 2B, the sum of the squares of components 50a, 50b at position 1 is the same as that at position 5, ignoring for now the errors introduced by the rotator 48. Therefore, in the forward direction, the input power of the beam is the same as the output beam. There, isolator 30 is a polarization independent There isolator.

Figure 2C:
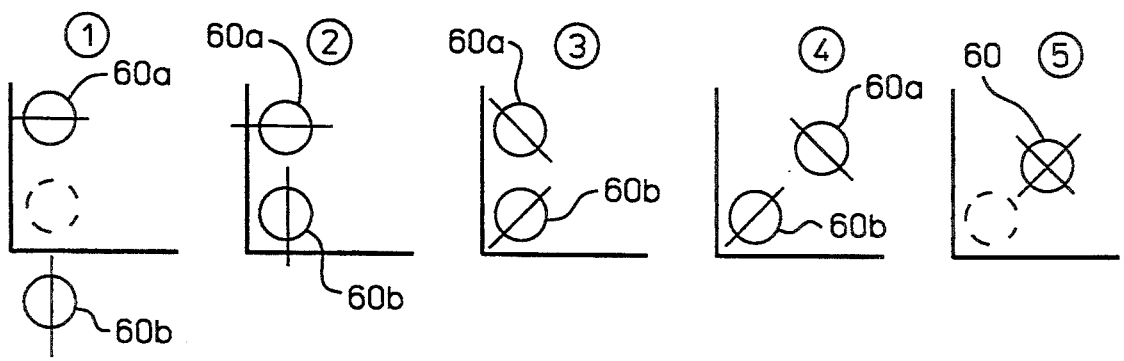

FIG. 2C illustrates the position of beam 60 travelling in the reverse direction from position 5 towards position 1. In FIGS. 2C, 8B, 8C, and 9C, the location of the input optical fiber is shown as a dashed circle to facilitate recognition of the relative location of the various optical beams in relation to the lateral position of this input optical fiber. As shown in FIG. 2C, beam 60 emerges from member 46 as two rays 60a, 60b. Member 44 further causes ray 60a to walk off so that the positions of the two rays are as shown in position 3 in FIG. 2C. Faraday rotator 48 rotates the two rays in a counterclockwise direction by about 45°. Member 42 causes ray 60b to walk off so that the positions of the two rays are as shown in position 1 in FIG. 2C. From FIG. 2C, it is evident that the positions of the two rays 60a, 60b walk away from the original forward travelling direction of beam 50. For this reason, lens 36 of FIG. 1 will not focus beam 60 at the end surface of input fiber 32. In other words, light travelling in the reverse direction from fiber 34 towards fiber 32 will not enter fiber 32.

Hence isolator 30 permits light to be transmitted from fiber 32 to fiber 34 in the forward direction while minimizing the polarization dependence of output power but eliminates or greatly reduces the amount of light travelling in the reverse direction from fiber 34 towards fiber 32. What has been described so far is the action of a conventional polarization independent optical isolator.

As explained above in general terms without referring to the figures, if beam 50 has only the component 50a, or only component 50b, the beam will not be split into two rays when travelling in the forward direction. In such event, isolator 30 will introduce no optical path length difference in the forward direction. However, it is inconvenient to have to align the polarization of the input beam with a reference direction of the isolator or perhaps to have to use a linearly polarized beam. Described below is the usual situation where beam 50 has two components 50a, 50b.

Members 42, 44, 46 are anisotropic; the index of refraction $n_{eff}$ along the walk off direction of each member is different from the index of refraction $n_o$ along the direction orthogonal to the walk off direction. Therefore, each of the walk off crystals 42, 44, 46 will introduce an optical path length difference between the two rays 50a, 50b. From FIG. 2B, it is evident that in the forward direction, ray 50a will walk off twice, once between positions 1 and 2 and a second time between positions 3 and 4. In contrast, ray 50b will walk off only one time, namely, between positions 4 and 5. Thus, between positions 3 and 4, member 44 causes ray 50a to walk off and between positions 4 and 5, member 46 causes ray 50b to walk off. Since members 44, 46 are of substantially the same thickness a, the optical path length difference introduced by member 44 between rays 50a, 50b is equal and in substantially opposite direction to that introduced by member 46 so that the two will substantially cancel. However, the optical path length difference introduced between rays 50a, 50b by member 42 is uncompensated for. This is the case even though, as noted above, the output power remains independent of input polarization.

If such optical path length difference is greater than the coherent length of beam 50, when rays 50a, 50b, superpose at position 5, the two rays combined will lose the original polarization state and degree of polarization of beam 50 before passing through isolator 30. This is undesirable. This invention is based on the observation that, if an optical isolator is such that the optical path length difference introduced by each member is compensated for by that introduced by another member in the isolator, the net effect of the isolator will be to introduce no optical path length difference so that the polarization state and the degree of polarization of the original beam are preserved.

Figure 3A:
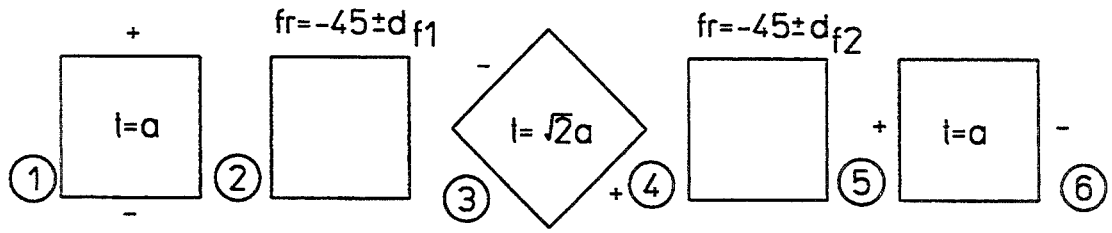
FIG. 3A are cross-sectional views of five elements of an array of elements constituting an optical isolator device of Ser. No. 07/222,597 referenced above, where the cross-sectional views are arranged side-by-side in the forward direction of the isolator to illustrate the optical isolator disclosed in the referenced application.

FIG. 3A are cross-sectional views of five elements of an array of elements constituting an optical isolator device of the above-referenced application Ser. No. 07/222,597, filed Jul. 21, 1988, where the same device is shown in FIG. 2A of such application. A more detailed discussion of the operation of such isolators and of the high performance optical isolators is described in Ser. No. 07/222,597, which is incorporated herein by reference in its entirety.

Figure 3B:
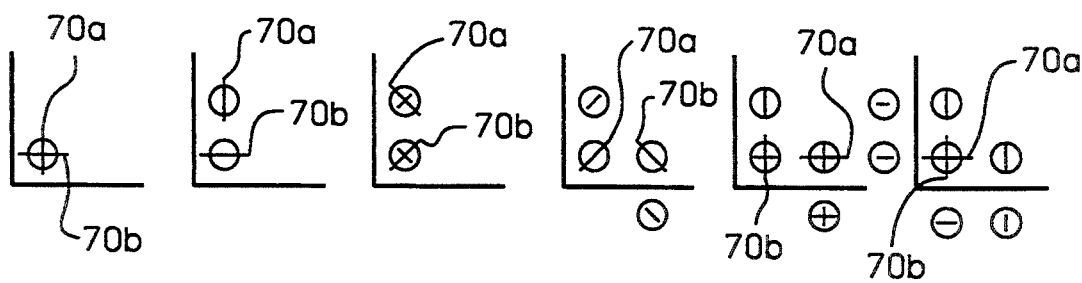
FIGS. 3B, 3C illustrate the positions of light rays passing through the device of FIG. 3A in the forward and reverse directions, respectively.
Figure 3C:
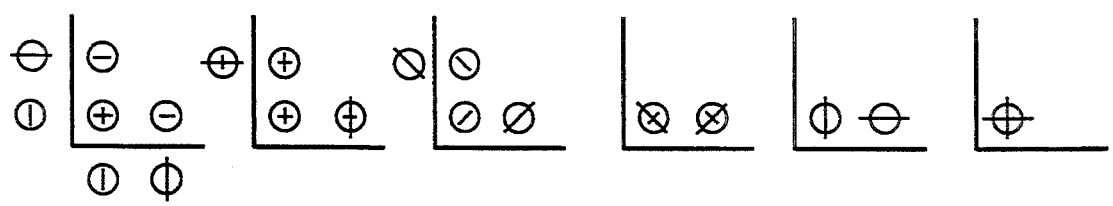

The cross-sectional views of FIG. 3A are arranged side-by-side from left to right in the forward direction of the isolator. FIGS. 3B, 3C illustrate the operation of the isolator of FIG. 3A in first splitting the beam in the forward direction and then superposing the two beams upon reaching position 6 in the forward direction and in causing the beams not to superpose each other in the reverse direction. FIGS. 3B, 3C are simplified versions of FIGS. 2B, 2C of Ser. No. 07/222,597. The detailed explanation of the isolation function of the isolator of FIGS. 3A–3C is set forth in Ser. No. 07/222,517. As explained in such application, the two Faraday rotators in FIG. 3A introduce errors df1, df2 respectively which are temperature and wavelength dependent.

The isolator of FIG. 3A achieves an isolation of the order of the fourth power of the sine of the error angle of rotation of the Faraday rotators. From FIG. 3B, it is evident that ray 70a will walk off three times whereas ray 70b will not walk off at all. In other words the optical path length difference introduced by the three walk off crystals and the device of FIG. 3A will add cumulatively and will not cancel each other at all. In other words, when passing through the three walk off crystals, ray 70a will experience refraction in accordance with the same index of refraction, namely, the index or refraction along the walk off direction whereas ray 70b will experience refraction in accordance with the index of refraction along the direction orthogonal to the walk off direction. As discussed above, the effects of such optical path length difference introduced are undesirable.

Figure 4B:
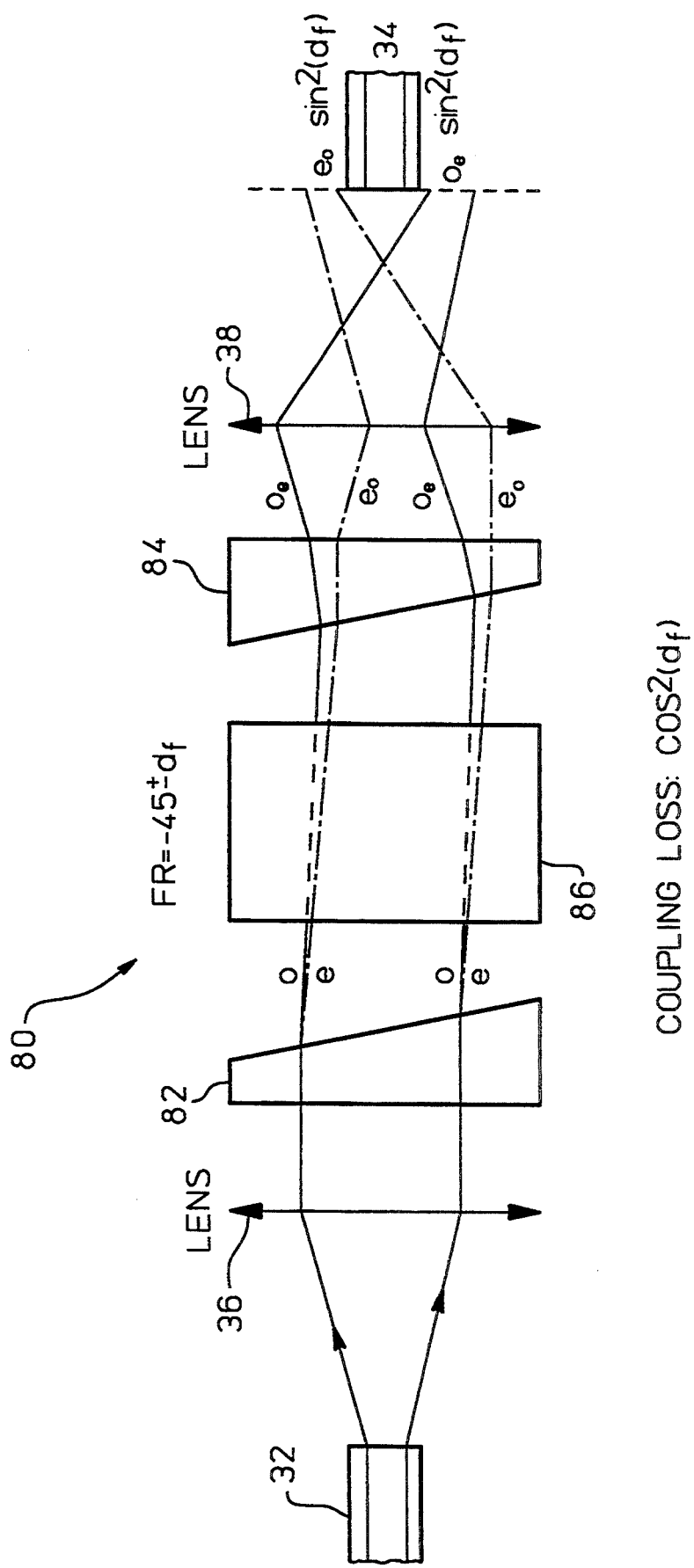
Figure 5A:
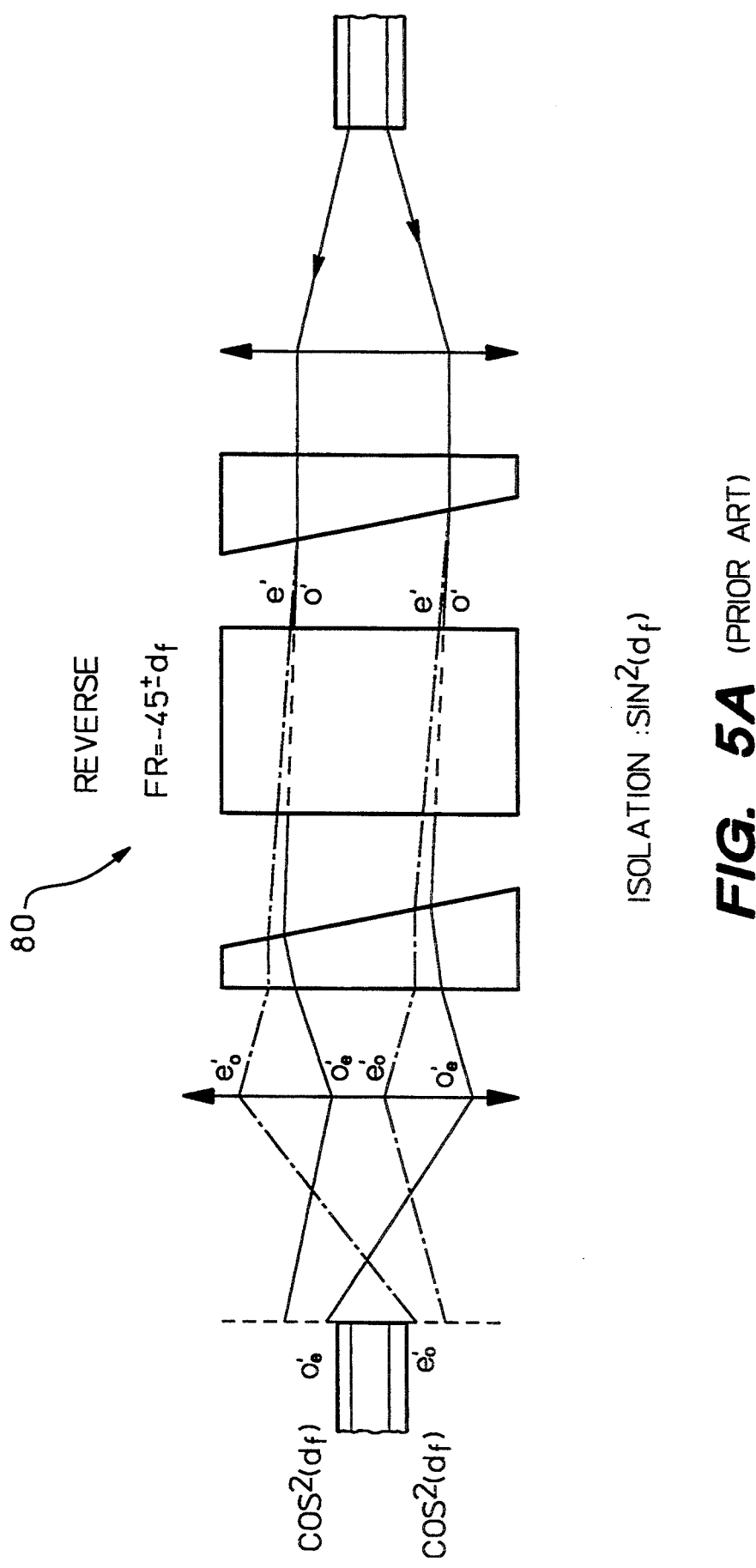
FIGS. 5A, 5B are schematic views of the isolator of FIGS. 4A, 4B illustrating the transmission of light in the reverse direction.
Figure 5B:
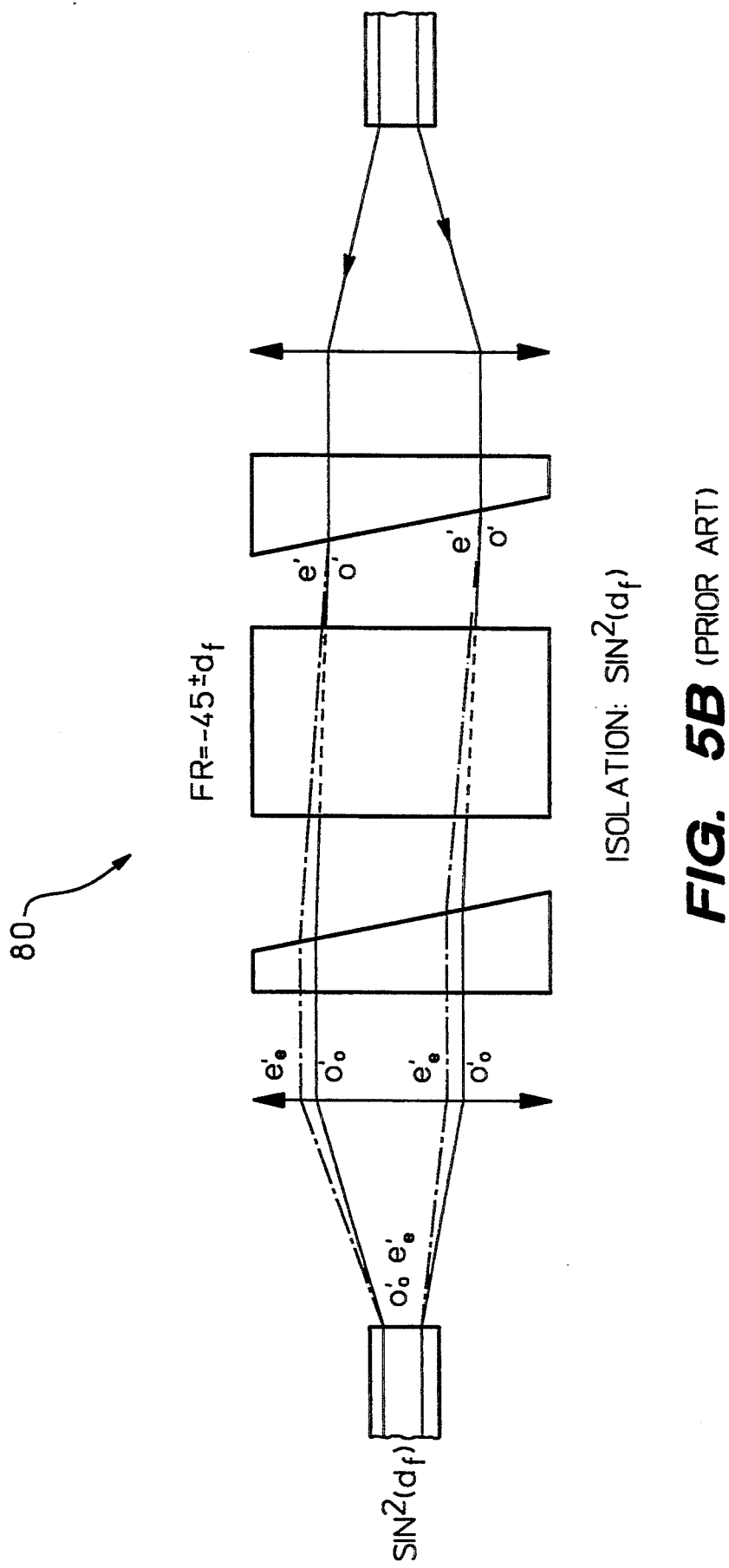

FIGS. 4A, 4B are schematic views of a prior art isolator in U.S. Pat. No. 4,548,478 to illustrate the transmission of light in the forward direction of such isolator. FIGS. 5A, 5B are schematic views of the isolator of FIGS. 4A, 4B illustrating the transmission of light in the reverse direction in such isolator. As shown in FIG. 4A, light from input fiber 32 are focused by lens 36 through an isolator 80. Upon emerging from isolator 80, the beam is again focused by lens 38 to output fiber 34.

Isolator 80 includes two wedges 82, 84 and a Faraday rotator 86 which rotates the plane of polarization of light by about 45° counterclockwise when viewed in the forward direction. Wedges 82, 84 are birefringent so that light travelling therethrough experience different amounts of divergence in accordance with two different indices of refraction $n_e$, $n_o$ along two orthogonal directions in the plane of the wedge plates. Thus, when light impinges upon wedge 82, two rays will emerge after passing through wedge 82: an O ray and an e ray. The O ray experiences a refraction in accordance with the index $n_o$ and the e ray experiences refraction in accordance with the index $n_e$. The two rays are rotated by a Faraday rotator 86. Upon reaching wedge 84, the two rays will experience refraction also in accordance with two indices of refraction $n_e$, $n_o$ in two orthogonal directions in the plane of the wedge plate.

The O ray which again experiences refraction in accordance with $n_o$ will emerge from wedge 84 as a ray parallel to the axis of fibers 32, 34 and will be focused by lens 38 onto fiber 34. Similarly the e ray which again experiences refraction in accordance with index $n_e$ will emerge parallel to the axis and will be focused by lens 38 onto fiber 34. The O ray which experiences refraction in accordance with the index $n_e$, however, will not emerge parallel to the axis and will be focused by lens 38 onto a location apart from fiber 34. The e ray which experienced refraction according to index $n_o$ by wedge 84 will also emerge at an angle to the axis and will be focused to a point away from fiber 34. Thus, isolator 80 permits transmission to fiber 34 in the forward direction only the O ray which experiences refraction in accordance with the index $n_o$ by both wedges 82, 84 and the e ray which experiences refraction in accordance with the index $n_e$ by both wedges 82, 84. Since $n_e$ is different from $n_o$, an optical path length difference will be introduced between the two rays which are focused onto fiber 34. As discussed above, this is undesirable.

In FIG. 4A the ray which has experienced refraction in accordance with the index $n_o$ through both wedges 82, 84 are labelled $O_o$ and the ray which has experienced the index $n_e$ in both wedges is labelled $e_e$ in FIG. 4A. In reference to FIG. 4B, the ray which has experienced refraction according to index $n_o$ in wedge 82 and index $n_e$ in wedge 84 is labelled $O_e$ and the ray which has experienced the refraction according to index $n_e$ in wedge 82 and index $n_o$ in wedge 84 is labelled $e_o$. FIGS. 5A, 5B simply illustrate the operation of isolator 80 in the reverse direction.

Figure 6A:
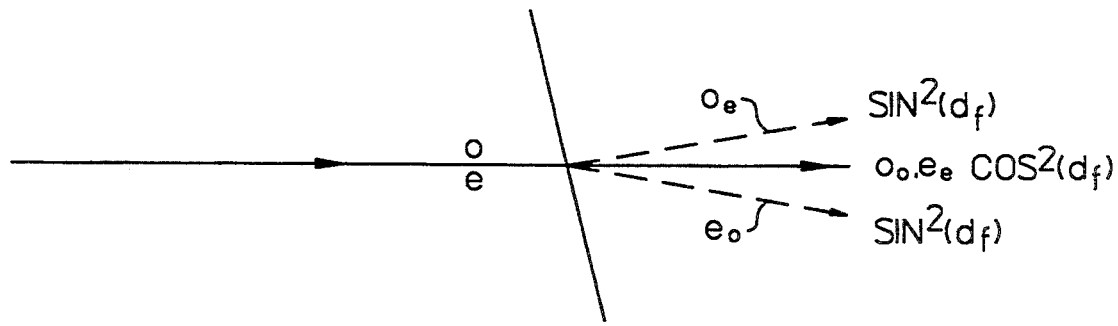
FIGS. 6A, 6B are schematic views of the light rays passing in the forward and reverse directions, respectively to illustrate the isolator of FIGS. 4A–5B.
Figure 6B:
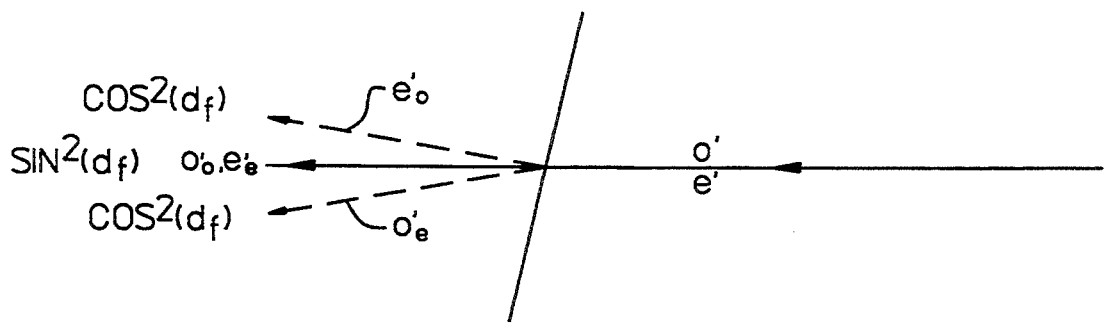

FIGS. 6A, 6B are schematic views of the rays emerging from isolator 80 of FIGS. 4A, 4B, 5A, 5B respectively in the forward and reverse directions to illustrate its isolation function. From FIG. 6A, the two rays which are transmitted in the forward direction are $O_o$, $e_e$ so that the coupling loss is the second power of the cosine of the error angle of the Faraday rotator and the isolation is the square of the sine of the error angle of the rotator.

Figure 7:
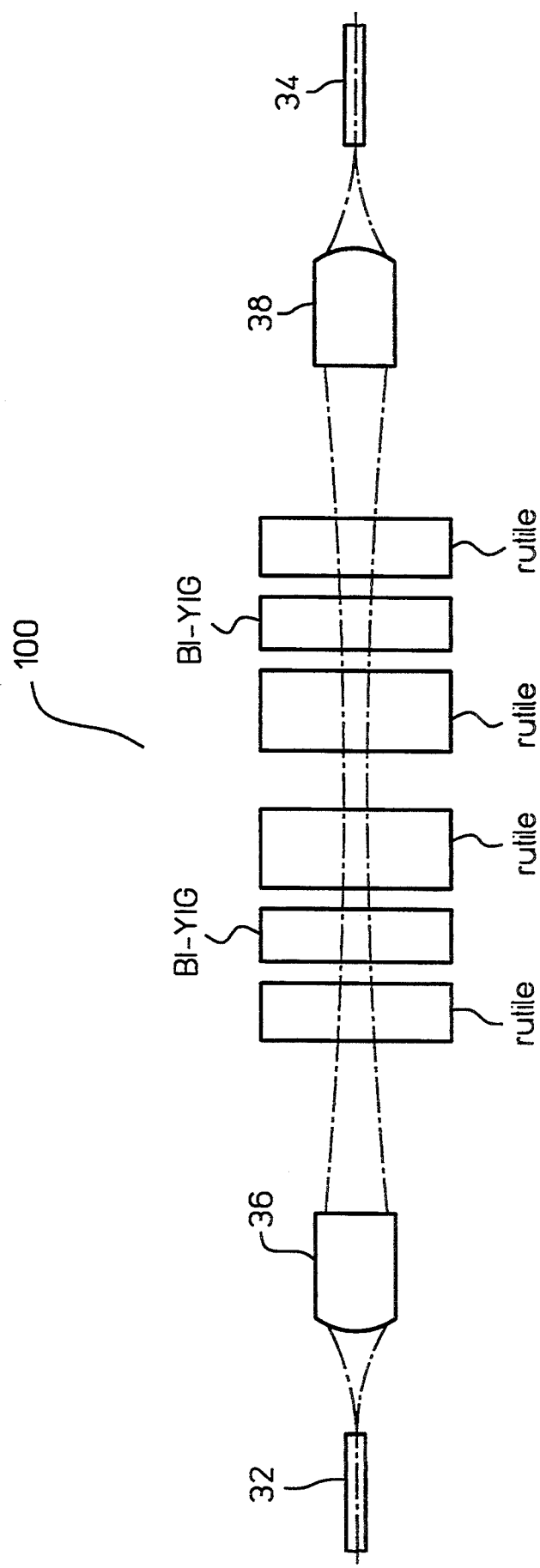
FIG. 7 is a side view of an array of elements constituting a polarization preserving optical isolator to illustrate the invention.

FIG. 7 is the side view of an array of elements constituting the polarization preserving optical isolator to illustrate the invention. Thus isolator 100 permits light focused by lens 36 to be transmitted towards lens 38, which focuses the light onto fiber 34. Isolator 100, however, eliminates or greatly reduces the light transmitted in the reverse direction from fiber 34 towards fiber 32. Isolator 100 also has the property of preserving the polarization state and the degree of polarization of the light transmitted in the forward direction independent of the polarization state of the input light from fiber 32.

In the special case where the polarization plane of the input light is parallel to the walk off direction of the first crystal in isolator 100 in the forward direction, the input light will remain one beam when travelling in the forward direction. Except for this special case, in performing its function of isolation, isolator 100 again splits the light in the forward direction to a first and a second ray of substantially linear polarizations where the polarizations of the two rays are substantially orthogonal to each other. Isolator 100, however, has the further property that the optical path length difference introduced by one component of the isolator is compensated by the optical path length difference introduced by another component so that there is no net optical path length difference between the two rays when they are superposed upon reaching lens 38 and fiber 34. The operation of isolator 100 will be illustrated below in reference to FIGS. 8A–8C.

Figure 8A:
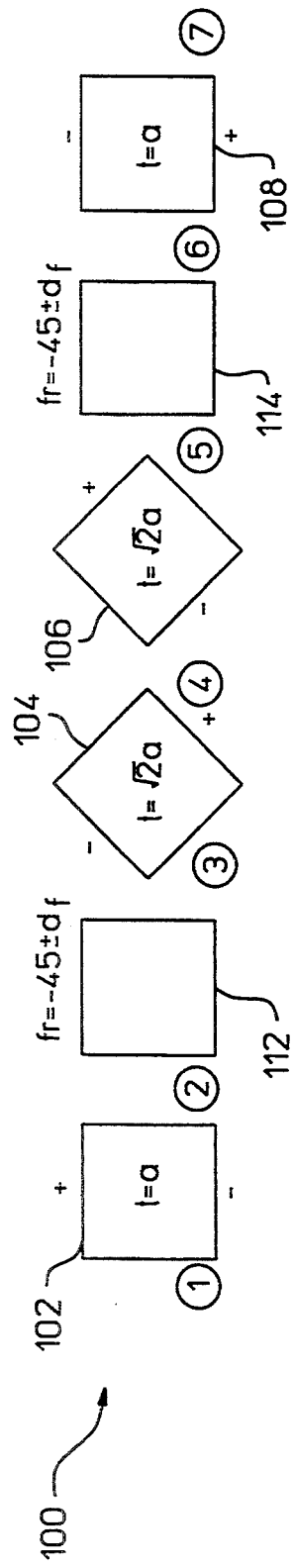
FIG. 8A are cross-sectional views of the six elements of FIG. 7, where the cross-sectional views are arranged side-by-side in the same order as in the array of FIG. 7 and in the forward direction to illustrate the invention.
Figure 8B:
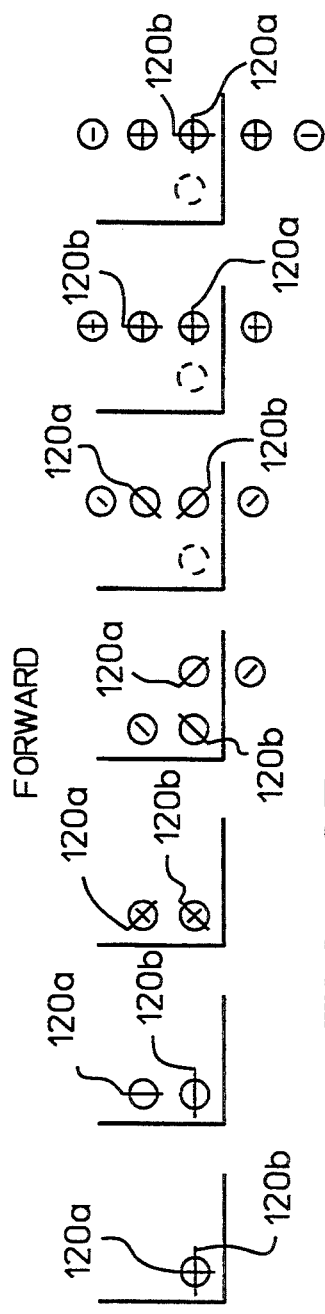
FIGS. 8B, 8C illustrate the positions of light rays passing through the device of FIG. 7, in the forward and reverse directions, respectively.
Figure 8C:
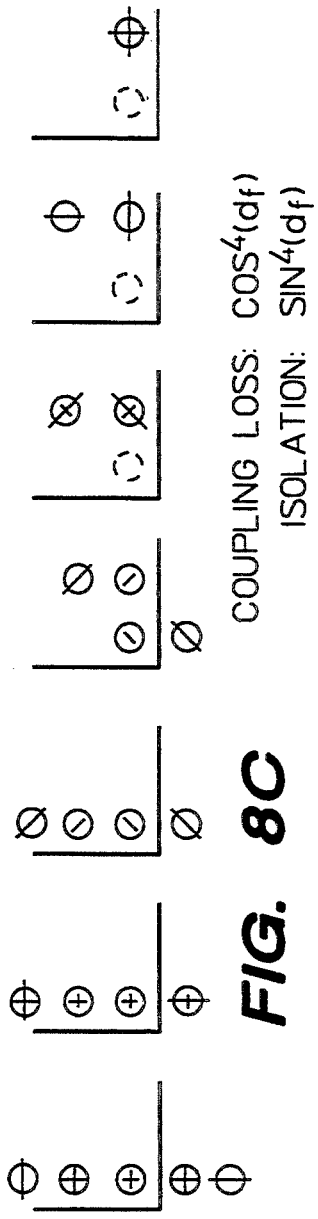

FIG. 8A are cross-sectional views of the six elements of FIG. 7, where the cross-sectional views are arranged side-by-side in the same order as in the array of FIG. 7 when viewed in the forward direction to illustrate the invention. Isolator 100 includes four walk off crystals 102, 104, 106, 108 with walk off directions as shown. Thus as shown in FIG. 8A, the walk off directions of members 104, 106, 108 are oriented at 135°, 45° and 180° clockwise relative to the walk off direction of member 102 when viewed in the forward direction. Members 102, 108 have thickness a approximately and members 104, 106 have thickness 1.4142a approximately. Isolator 100 also includes Faraday rotators 112, 114 which rotate the plane of polarization of light by 45° counterclockwise approximately where the angle of rotation may deviate from 45° by the error angle df. FIGS. 8B, 8C illustrate the positions of light rays passing through the device of FIG. 7 and FIG. 8A in the forward and reverse directions, respectively to illustrate the invention.

As shown in FIG. 8B, the beam focused by lens 36 onto isolator 100 is split into two rays by member 102, where the two rays are of substantially linear polarizations with their planes of polarizations substantially orthogonal to each other. The two rays are then rotated by Faraday rotator 112 which introduces a rotation error angle df; the two rays therefore will each have a major component in a direction which is rotated 45° counterclockwise from the original planes of polarization at position 2 and minor components in directions orthogonal to such planes. The major components are given by second power of the cosine of the error angle df and the minor components are given by the second power of sin df multiplied by the amplitude of the two rays. In FIG. 8B at position 3, the major components are shown by long lines and the minor components are shown by short lines.

Members 104, 106 cause the major and minor components to walk off as shown at positions 4 and 5. Faraday rotator 114 rotates the four rays and again introduces an error angle df, assuming that the error angle introduced by the rotators 112, 114 are the same and is df. Member 108 again causes the appropriate major and minor components to walk off so that the rays emerge at position 7 as shown in FIG. 8B. As shown in FIG. 8B, the major components do superpose and are given by the fourth power of the cosine of the error angle (df) of rotators 112, 114 whereas the minor components do not superpose. Hence the coupling loss is $\cos^4 df$. FIG. 8C illustrate the transmission in the reverse direction. When the rays are traced in a similar manner in the reverse direction, it is evident from FIG. 8C that the isolation is given by $\sin^4 df$.

In addition to the isolation properties as described above, isolator 100 also preserves polarization state and degree of polarization of incoming beam. In reference to FIG. 8B, since the minor components do not superpose at position 7, any optical path length difference introduced in such minor components do not affect light transmission in the forward direction and may simply be ignored. For this reason, for the purpose of determining optical path length difference, the minor components caused by the error angles in the Faraday rotators may be ignored.

The major components of the two rays in positions 1 through 7 are labelled 120a, 120b. From FIG. 8B, it will be noted that ray 120a walks off between positions 1,2 and between positions 3,4; ray 120b will walk off between positions 4,5 and between positions 6,7. Members 102, 108 have substantially the same thickness. Therefore, the optical path length difference introduced between the two rays by member 102 is compensated for by that introduced by member 108, since the optical path length differences introduced by the two members are in opposite directions. Similarly, since members 104, 106 have substantially the same thickness, and they introduce optical path length difference in opposite directions, the optical path length differences introduced by the two members substantially cancel. The net effect is to introduce substantially no path length difference between rays 102a, 102b at position 7.

While the orientations of the four walk off crystals and two Faraday rotators of isolator 100 in FIG. 8A will preserve the polarization state and degree of polarization of the incoming beam, other orientations are possible. Such orientations are shown in Table 1, below, where a negative (−) sign indicates rotation in the counterclockwise direction and a (+) sign indicates rotation in the clockwise direction, both viewed in the forward direction. In reference to the walk off directions, walk off direction of member 102 is used as the reference and the walk off direction of members 104–108 are indicated as degrees rotated clockwise when viewed in the forward direction. Thus, the first row of numbers in Table 1 illustrate the orientations of the four members 102–108 and the two Faraday rotators 112, 114 as shown in FIG. 8A. Thus, all possible orientations of the four members and of the two Faraday rotators shown in Table 1 may also be used to preserve the polarization state and the degree of polarization of the incoming light as well as achieving isolation and are within the scope of the invention.

TABLE 1

| Faraday Rotation | | Walk-off directions | | | |
|---|---|---|---|---|---|
| 112 | 114 | 102 | 104 | 106 | 108 |
| −45 | −45 | 0.0 | 135 | 45 | 180 |
| −45 | −45 | 0.0 | 45 | 135 | 180 |
| +45 | +45 | 0.0 | 225 | 315 | 180 |
| +45 | +45 | 0.0 | 315 | 225 | 180 |

FIG. 9A are cross-sectional views of seven elements of an array of elements constituting a polarization preserving optical isolator device, where the cross-sectional views are arranged side-by-side from left to right in the forward direction to illustrate another embodiment of the invention. FIGS. 9B, 9C illustrate the positions of light rays passing through the device of FIG. 9A in the forward and reverse directions respectively. The device of FIG. 9A differs from that of FIG. 8A in that it includes an additional Faraday rotator and in the particular orientations of the seven elements therein. In a manner similar to the operation of the device of FIGS. 8A–8C the device of FIG. 9A permits the transmission of light in the forward direction and eliminates or greatly reduces transmission of light in the reverse direction while preserving the polarization state and the degree of polarization of the incoming light in the forward direction.

The particular orientations of the four walk off crystals 152–158 and three Faraday rotators 162–166 in FIG. 9A enable the above-described functions to be accomplished. However, other orientations are possible and are summarized in Tables 2, 3 below. The above-described functions of isolation and preservation of polarization states is achieved when the orientations and rotations are given approximately by the values in the table. The convention used for Tables 2, 3 is similar to that of Table 1.

TABLE 2

| Faraday Rotation | | | Walk-off direction | | | |
|---|---|---|---|---|---|---|
| | | | 152 | 154 | 156 | 58 |
| 162 | 164 | 166 | a | 1.4142*a | a | 1.4142*a |
| −45 | −45 | +45 | 0.0 | 135 | 180 | 45 |
| −45 | −45 | +45 | 0.0 | 45 | 180 | 135 |
| +45 | +45 | −45 | 0.0 | 225 | 180 | 315 |
| +45 | +45 | −45 | 0.0 | 315 | 180 | 225 |

Thickness of walk off elements 152, 156 is a. Thickness of walk off elements 154, 158 is 1.4142*a.

TABLE 3

| Faraday Rotation | | | Walk-off directions | | | |
|---|---|---|---|---|---|---|
| | | | 152 | 156 | 156 | 158 |
| 162 | 164 | 166 | a | 1/1.4142*a | a | 1/1.4142*a |
| −45 | +45 | +45 | 0.0 | 135 | 90 | 315 |
| −45 | +45 | +45 | 0.0 | 45 | 270 | 225 |
| +45 | −45 | −45 | 0.0 | 225 | 270 | 45 |
| +45 | −45 | −45 | 0.0 | 315 | 90 | 135 |

Thickness of walk off elements 152, 156 is a. Thickness of walk off elements 154, 158 is 1/1.4142*a.

Figure 10A:
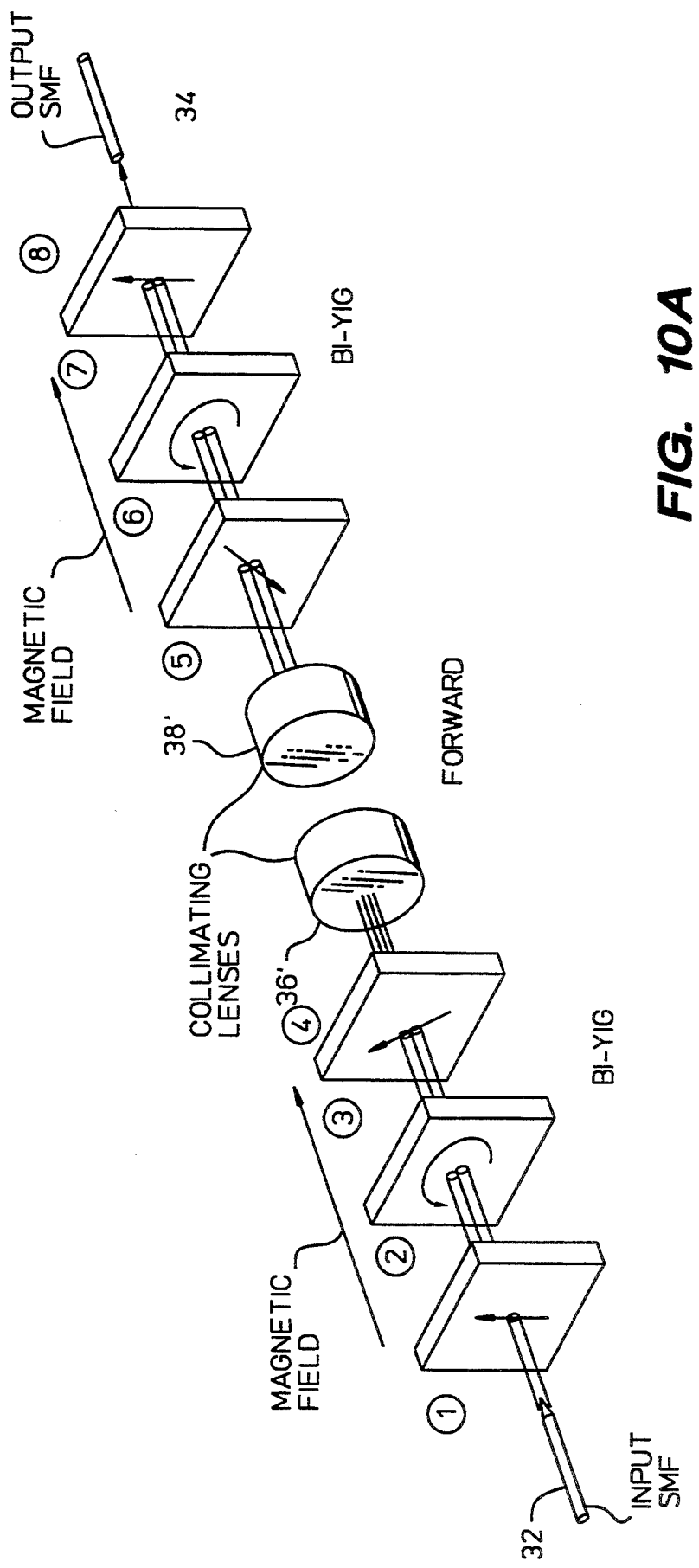
FIGS. 10A, 10B are perspective views of an array of elements constituting a polarization preserving optical isolator illustrating the passage of light in the forward and reverse directions, respectively to illustrate another embodiment of the invention.
Figure 10B:
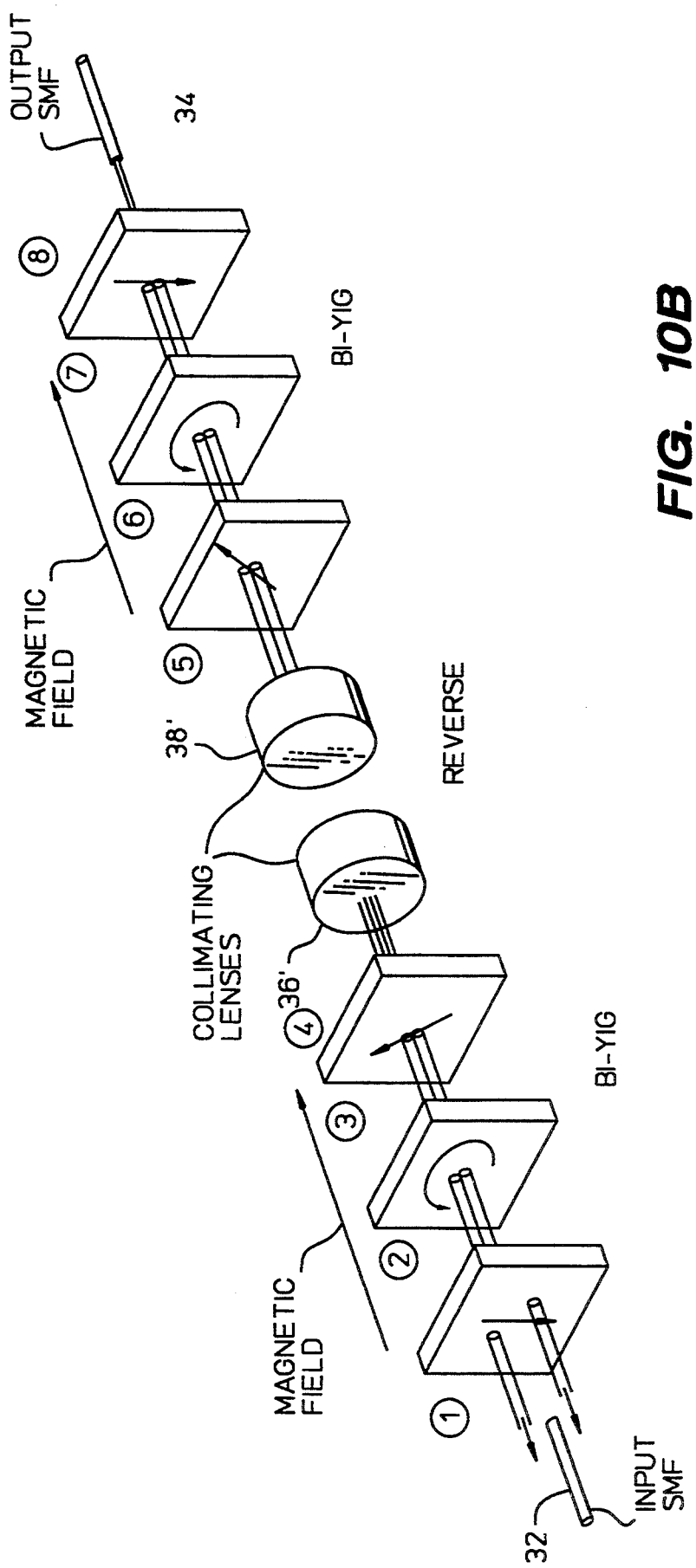

FIGS. 10A, 10B are perspective views of an array of elements constituting a polarization preserving optical isolator illustrating the passage of light in the forward and reverse directions respectively to illustrate yet another embodiment of the invention. As shown in FIGS. 10A, 10B, instead of placing the focusing lenses between the input and output fibers and the isolator, two collimating lenses 36', 38' separate the isolator into two parts, one part connected to or integral with the input fiber 32 and another part connected to or integral with fiber 34. This particular configuration has the advantage that it is easy to optically align two ends of the fibers by optically aligning two collimating lenses 36', 38'. As will be shown below, such a configuration is also advantageous in that reflections from the lenses are also isolated.

Figure 11A:
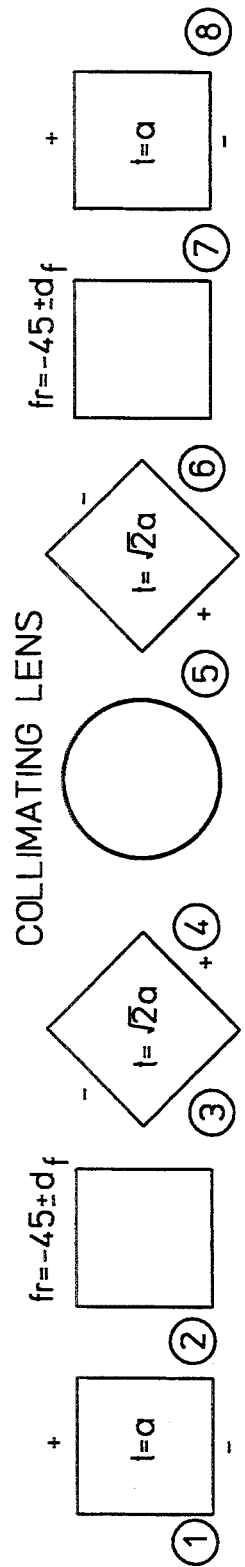
FIG. 11A are cross-sectional views of FIGS. 10A, 10B, where the cross-sectional views are arranged side-by-side in the same order as in the array of FIGS. 10A, 10B in the forward direction.
Figure 11B:
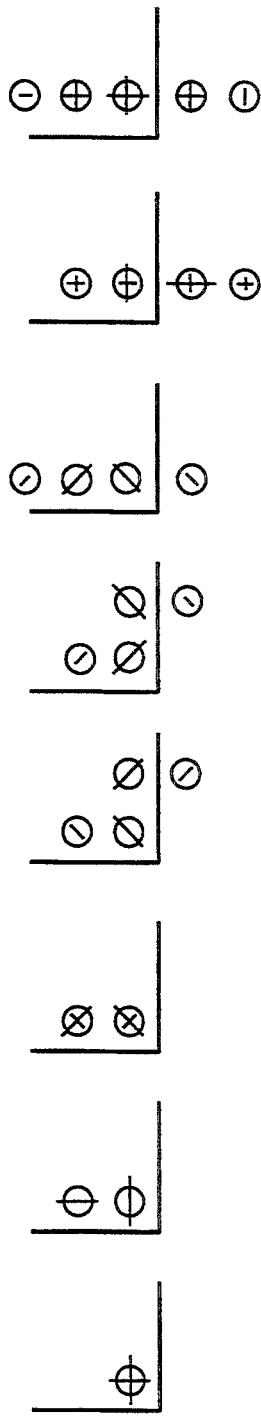
FIGS. 11B, 11C illustrate the positions of light rays passing through the device of FIGS. 10A, 10B, 11A in the forward and reverse directions respectively.
Figure 11C:
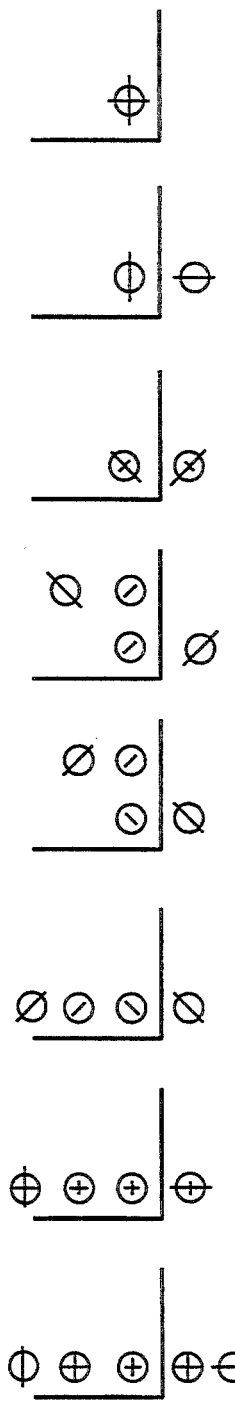

FIG. 11A are cross-sectional views of the isolator of FIGS. 10A, 10B, where the cross-sectional views are arranged side-by-side in the same order as in the array of FIGS. 10A, 10B in the forward direction as in the array in FIGS. 10A, 10B. The thicknesses and orientations of the walk off directions of the four walk off crystals in FIG. 11A are shown in the figure and angles of rotation of the two Faraday rotators are also as shown. The effect of the pair of collimating lenses is to invert the positions of the rays between positions 4 and 5 in FIG. 11A; this is illustrated in FIG. 11B. FIGS. 11B, 11C illustrate the positions of light rays passing through the device of FIGS. 10A, 10B, 11A in the forward and reverse directions respectively. Thus as shown in FIGS. 11B, 11C, the major components superpose at position 8 in the forward direction and they do not superpose in the reverse direction at position 1. Thus the isolator of FIGS. 10A–11C permits light to be transmitted in the forward direction but eliminates or greatly reduces light travelling in the reverse direction.

When the rays in FIG. 11B are traced in a manner similar to those described above of other embodiments of the invention, it will be evident that the main components that eventually do superpose at position 8 in the forward direction experience the same number of walk offs of distances and in directions causing optical path length differences which cancel, so that upon superposition at position 8, there is substantially no optical path length difference between the major components of the two rays.

Figure 11D:
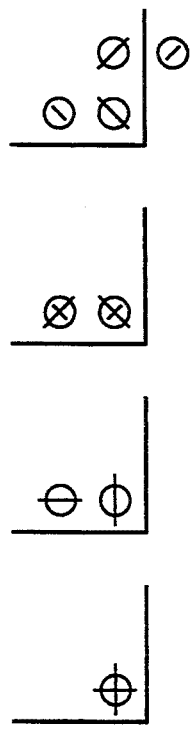
FIGS. 11D, 11E illustrate the positions of light rays passing through the first three elements of the array of FIG. 11A in the forward direction and of light rays reflected by the collimating lenses in the reverse direction respectively.
Figure 11E:
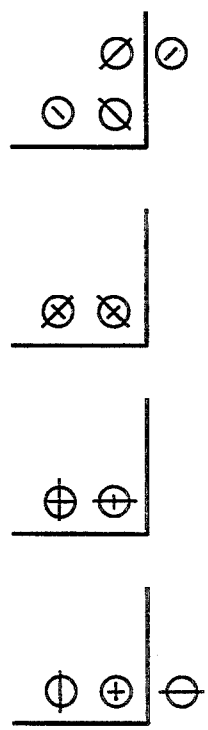

FIGS. 11D, 11E illustrate the positions of light rays passing through the first three elements of the array of FIG. 11A in the forward direction and of light rays reflected by the collimating lenses in the reverse direction respectively. As shown in FIG. 11D, the incoming light travelling in the forward direction progresses to position 4 in a manner similar to that in FIG. 11B. The collimating lenses do reflect light back towards the incoming fiber 32 in the reverse direction; the positions of rays travelling in such reverse direction are illustrated in FIG. 11E. It is evident from FIG. 11E that the major components of the rays reflected by the collimating lenses also do not superpose at the position where the incoming beam originates in FIG. 11D. This means that reflections from the collimating lenses are eliminated or greatly reduced when reaching the incoming fiber 32. Thus while reflections from lens 36 may be reflected back towards fiber 32 in a configuration such as in FIG. 7, the reflections from the collimating lenses 36', 38' will be further isolated in the reverse direction in the configuration of FIGS. 10A–11E.

While the particular configuration of FIG. 11A will function as described above, it will be understood that the collimating lenses may be placed at other locations as well. Thus, the pair of collimating lenses may be placed anywhere in the array between the two Faraday rotators. In other words, they may be moved to position 3 or position 6 in FIG. 11A. The configurations of FIGS. 7–9C may be modified simply by introducing a pair of collimating lenses. In such event, the above tables 1–3 may be modified simply to illustrate the possible configurations that may be used. In reference to Table 1, for example, a pair of collimating lenses may be placed between members 104, 106 or between Faraday rotator 112, member 104 or between member 106 and Faraday rotator 114. Since the effect of the collimating lenses is to cause the images of the forward travelling rays to invert, therefore, depending on the location of the collimating lenses, the orientations of the walk off members located in front of the lenses in the forward direction will remain the same as those shown in Table 1. For the walk off members located behind the lenses in the forward direction, the orientations should be changed by adding 180° to that shown in Table 1. In regard to Tables 2 and 3 the pair of collimating lenses may be placed anywhere in the array between Faraday rotation elements 162, 166. Again, depending on the location of the collimating lenses, the orientations of the walk off members located in front of the lenses when viewed in the forward direction may remain the same as those shown in Tables 2 and 3 whereas the orientations of the walk off members behind the lenses when similarly viewed should be changed by adding 180° to those shown in Tables 2 and 3 above.

Figure 12A:
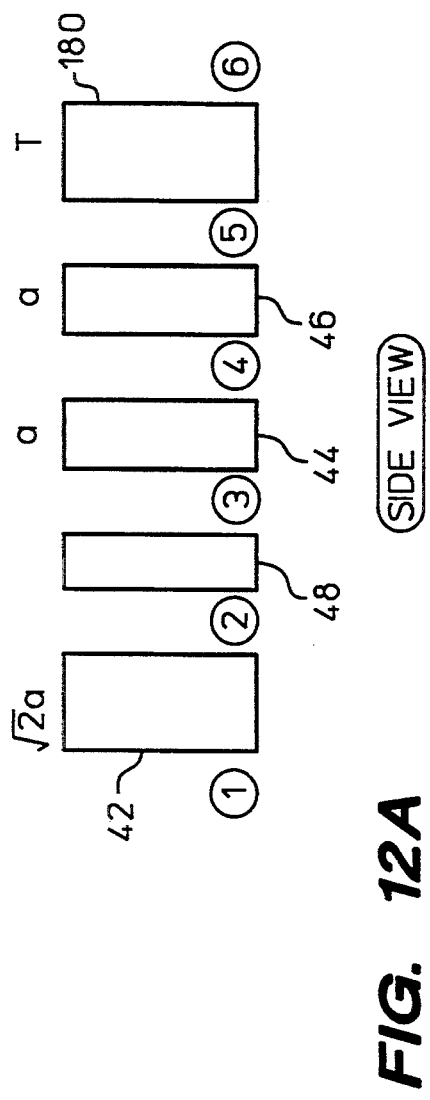
FIG. 12A is a side view of an array of elements constituting a polarization preserving optical isolator device illustrating still another embodiment of the invention.
Figure 12B:
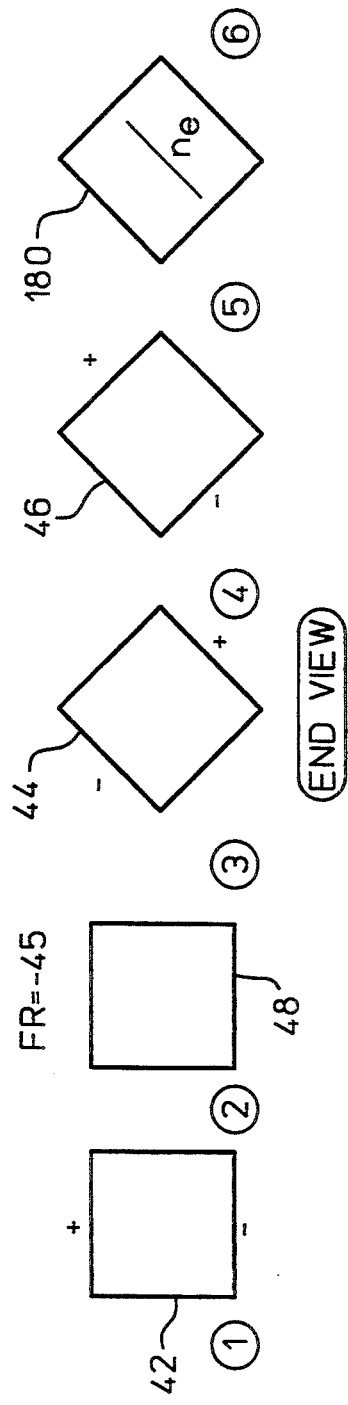
FIG. 12B are cross-sectional views of the five elements of FIG. 12A arranged side-by-side in the same order as in the array of FIG. 12A in the forward direction.

FIG. 12A is a side view of an array of elements constituting a polarization preserving optical isolator device illustrating still another embodiment of the invention. A comparison of FIG. 12A to FIG. 1 will illustrate that the device of FIG. 12A differs from that of FIG. 1 only in that a birefringent plate 180 has been added at the end of the array. As discussed above in reference to FIGS. 2A–2C, the optical path length difference introduced between rays 50a, 50b by member 42 is uncompensated for. In reference to FIG. 12A, member 42 introduces an optical path length difference $(n_{eff}-n_o)$ *1.4142a between rays 50a, 50b. Birefringent plate 180 is added to introduce an optical path length difference $(n_e-n_o)*T$, T being the thickness of plate 180; such difference is opposite to that introduced by the member 42 and substantially compensates for it so that when the two rays superpose at position 6, there is substantially no optical path length difference between the two rays. The respective orientations and thicknesses of the five elements are as shown in FIG. 12B. The thickness of plate 180 is chosen such that $(n_{eff}-n_o)*1.4142a$ is substantially equal to $(n_e-n_o)*T$.

In reference to the prior art wedge type isolators of FIGS. 4A-5B, it is first noted that the orientations of the wedges in such figures are schematic and do not represent the actual orientations of the wedges. For the wedges to perform the functions indicated by Shirasaki in U.S. Pat. No. 4,548,478, the optical axes of the two wedges should be rotated relative to each other. Such a configuration is illustrated by the two birefringent wedges and the Faraday rotator between positions 1 and 4 in FIG. 12C. FIG. 12C is a side view of an array of elements constituting a polarization preserving optical isolator device employing birefringent wedges and plates to illustrate yet another embodiment of the invention. FIG. 12D are cross-sectional views of the elements of FIG. 12C arranged side-by-side in the same order as in the array of FIG. 12C in the forward direction. The arrows 202a, 204a illustrate the direction of taper of the wedges 202, 204 from the thick end towards the thin end. The $n_e$ axis of each of the wedges 202, 204 is substantially parallel respectively to the directions 202a, 204a. Since the birefringent plate is not tapered, only the $n_e$ direction is illustrated. The above described convention of taper angles and optical axis will be used for other figures in the application as well.

A comparison of FIG. 12C and FIG. 4A will show that the device of FIG. 12C differs from that of FIG. 4A only in that it includes an additional birefringent plate to compensate for the optical path length difference introduced by the two wedges in device 80 of FIG. 4A. If the average thickness of the two birefringent wedges are $T_1$ and $T_2$ respectively, the thickness of the birefringent plate 208 should be substantially equal to the sum of $T_1$ and $T_2$. The orientations of the four elements of the device in FIG. 12C are shown in FIG. 12D. The effect is that the plate introduces substantially equal but opposite optical path length difference to that introduced by the two wedges, and the two differences cancel.

Figure 13:
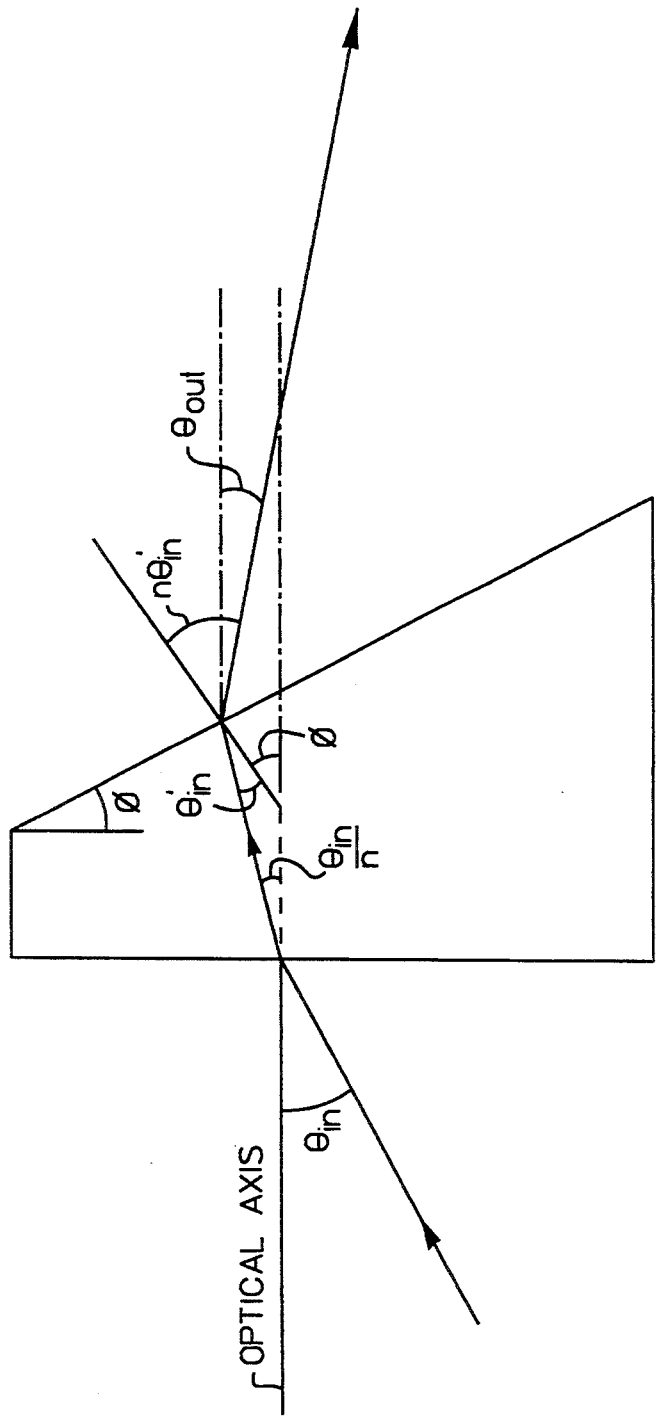
FIG. 13 is a schematic view of a birefringent wedge and a light ray passing therethrough to illustrate the geometrical relationship between the tapering angle of the wedge and the indices of refraction and the incidence angles for illustrating the invention.

FIG. 13 is a schematic view of a birefringent wedge and a light ray passing therethrough to illustrate the geometrical relationship between the tapering angle of the wedge and the indices of refraction of the wedge and the incidence angles of the array to illustrate the invention. A birefringent wedge has two refraction indices. If two beams impinge the wedge at different incidence angles, in order for the output beams of the wedge to be parallel to one another, the tapering angle of the wedge must be equal to the ratio of the difference between the incidence angles and the difference between the two refraction indices, a formula which is illustrated in FIG. 13.

FIG. 14A is a side view of an array of elements constituting a polarization preserving optical isolator device to illustrate an embodiment of the invention. FIG. 14B are cross-sectional views of four elements of FIG. 14A arranged side-by-side in the same order as in the array of FIG. 14A in the forward direction.

In comparing FIGS. 12D and 14B, it will be noted that wedge 206 of FIG. 14B is rotated by 90° relative to wedge 204 of FIG. 12D. The input beam is split into two rays by wedge 202 where one ray O experiences refraction according to the index $n_o$ and the other ray e experiences refraction according to the index $n_e$. When these two rays reach wedge 206, the O ray experiences refraction according to the index $n_e$ and the e ray experiences refraction according to the index $n_o$. Since the two wedges are of substantially the same thickness, the optical path length differences introduced by the two wedges substantially cancel. Applying the relationship derived from FIG. 13, the emerging beams from wedge 206 may be made parallel by rotating wedge 206 so that the $n_o$ axis becomes the $n_e$ axis and also by rotating the direction of taper. While the output beams of wedge 206 are parallel, the beams are not parallel to the axes of the input and output optical fibers. An isotropic member such as a glass wedge is then used to bend the output beams so that they become parallel to the axis. The direction 210a illustrates the direction of taper where the thick end of 210a indicates the thin end of the glass wedge. The net effect is that the isolator of FIG. 14A, 14B preserves the polarization state and the degree of polarization of the input light in the forward direction and that the output beam emerges parallel to the axis.

Figure 15A:
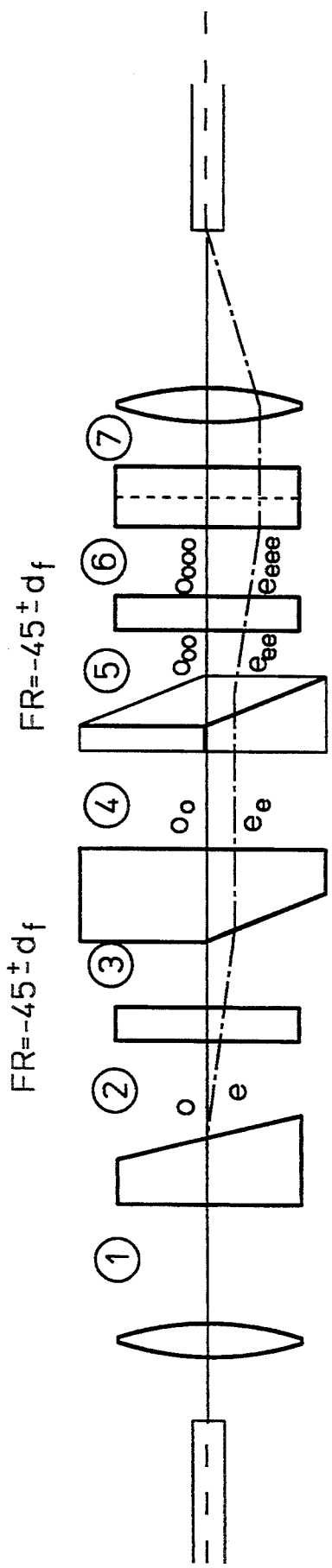
FIG. 15A is a side view of an array of elements arrived at by putting side by side two optical isolators of the type in U.S. Pat. No. 4,548,478 to illustrate the effect of putting two such devices together.
Figure 15B:
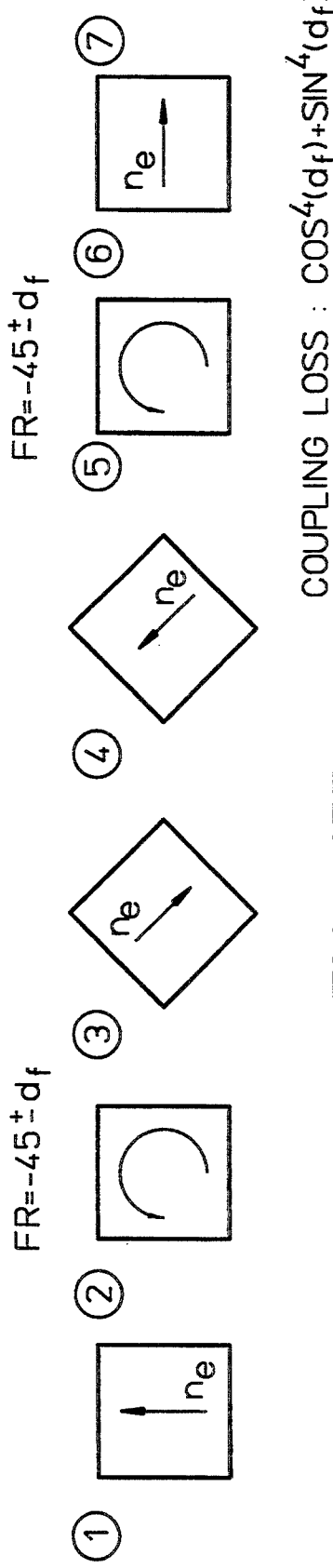
FIG. 15B are cross-sectional views of six elements of FIG. 15A, where the cross-sectional views are arranged side-by-side in the same order as in the array of FIG. 15A in the forward direction.

FIG. 15A is a side view of an array of elements arrived at by putting side-by-side two optical isolators of the type in U.S. Pat. No. 4,548,478 to illustrate the effect of putting two such devices together. FIG. 15B are cross-sectional views of six elements of FIG. 15A, where the cross-sectional views are arranged side-by-side in the same order as in the array of FIG. 15A in the forward direction.

Figure 16A:
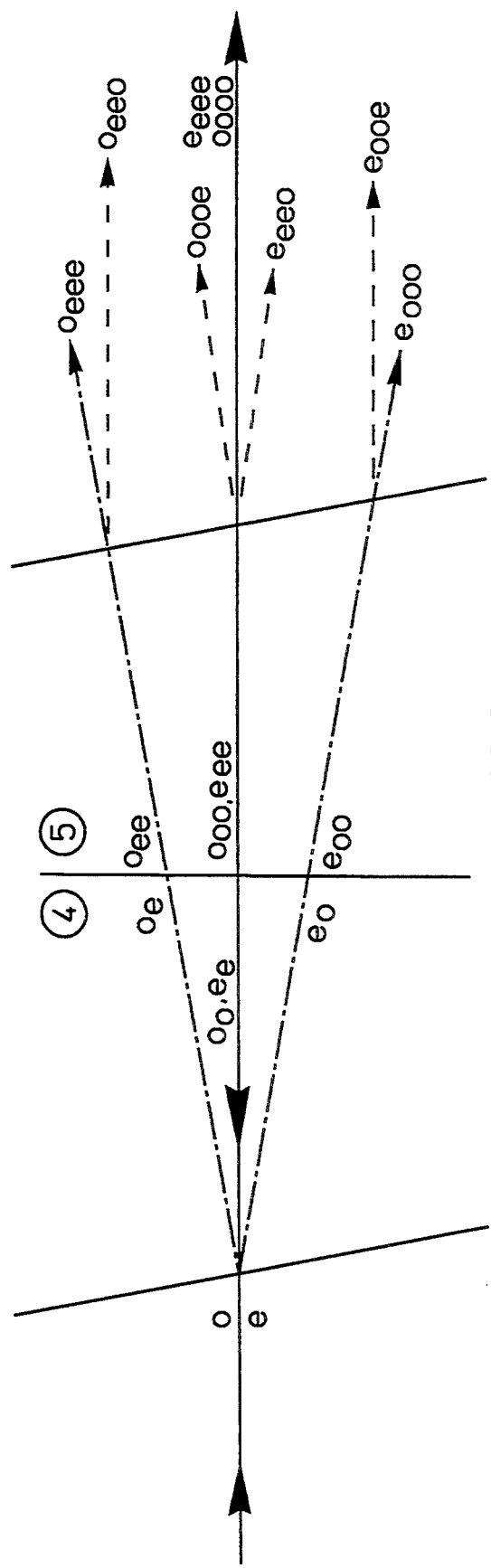
FIGS. 16A, 16B are schematic views of light rays passing in the forward and reverse directions, respectively to illustrate the operation of the device of FIGS. 15A, 15B.
Figure 16B:
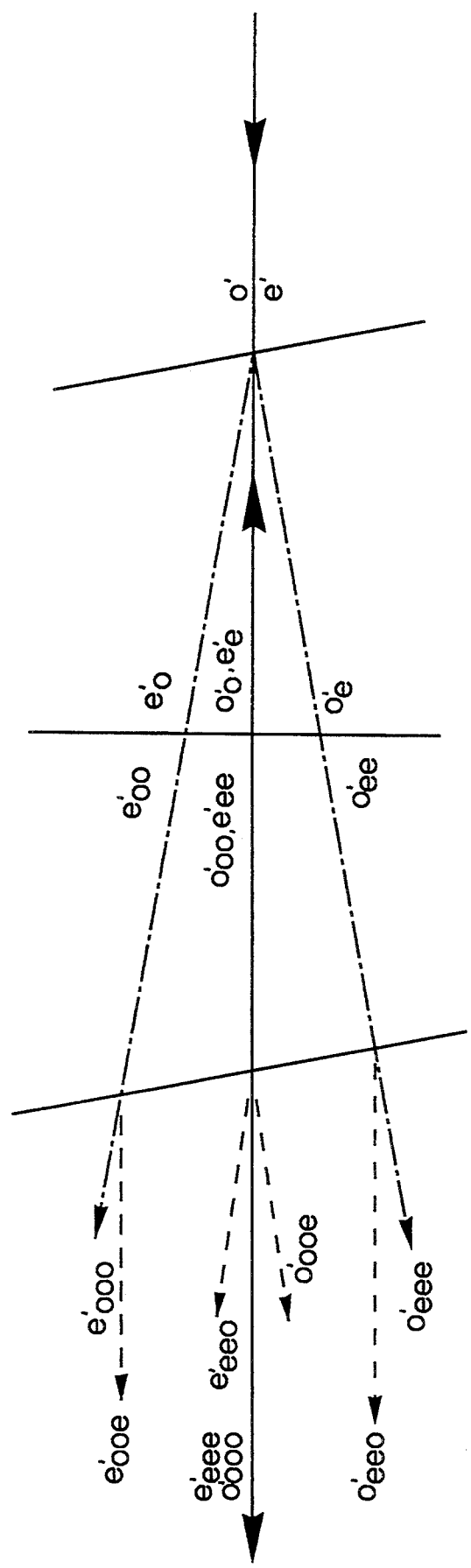

FIGS. 16A, 16B are schematic views of light rays passing in the forward and reverse directions, respectively to illustrate the operation of the device of FIGS. 15A, 15B. As illustrated in FIGS. 15A, 15B, 16A, 16B, rays $O_{ooo}$, $e_{eee}$, $O_{eeo}$ and ray $e_{ooe}$ emerge parallel to the axis. The labelling convention used for the rays are the same as those used in FIGS. 4A, 4B, 5A, 5B. In other words, the ray $O_{eeo}$ has experienced refractions in accordance with $n_o$, $n_e$, $n_e$, $n_o$, respectively when passing through the four wedges of FIGS. 15A, 15B. The rays $O_{eeo}$, $e_{ooe}$ have the magnitude $\sin^4 df$ where df is the error angle of the two Faraday rotators in the device of FIGS. 15A, 15B. The rays $O_{ooo}$, $e_{eee}$ have the magnitude $\cos^4 df$ so that the coupling loss is $(\cos^4 df + \sin^4 df)$. From FIG. 16B, light transmitted in a reverse direction is of the same magnitude as that of the light transmitted in the forward direction so that there is no isolation at all achieved by putting two devices of the type in U.S. Pat. No. 4,548,478 together.

Figure 17A:
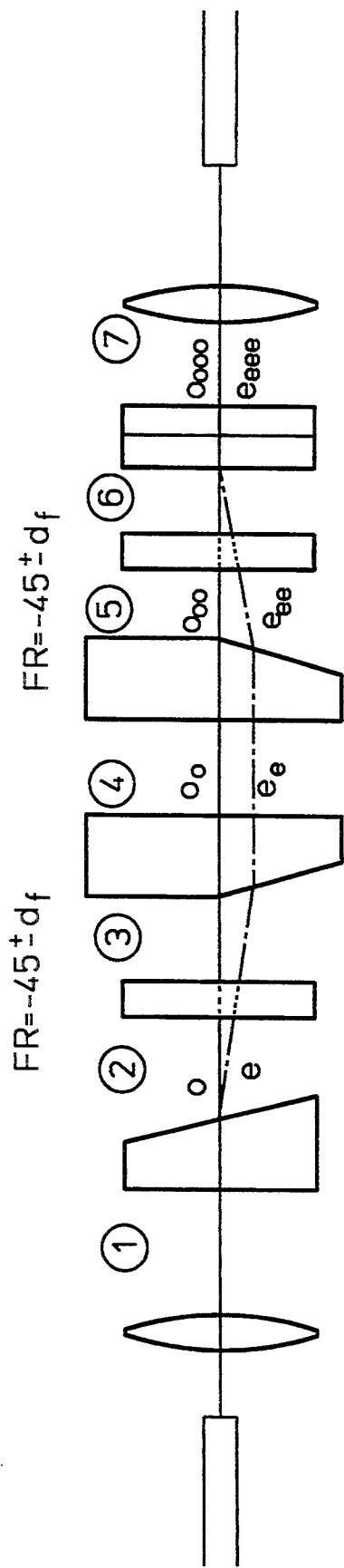
FIG. 17A is a side view of an array of elements constituting a non-polarization preserving optical isolator.
Figure 17B:
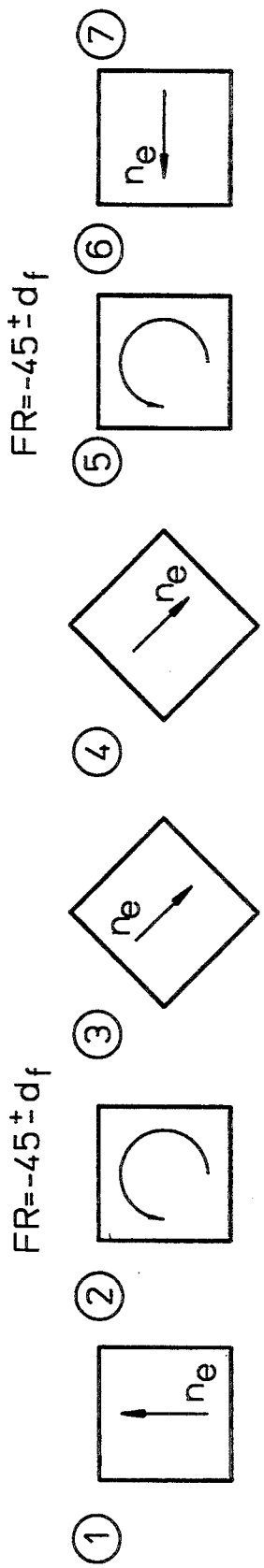
FIG. 17B are cross-sectional views of six elements of FIG. 17A, where the cross-sectional views are arranged side-by-side in the same order as in the array of FIG. 17A in the forward direction.

FIG. 17A is a side view of an array of elements constituting a non-polarization preserving optical isolator. FIG. 17B are cross-sectional views of six elements of FIG. 17A (excluding the lenses), where the cross-sectional views are arranged side-by-side in the same order as in the array of FIG. 17A in the forward direction.

Figure 18A:
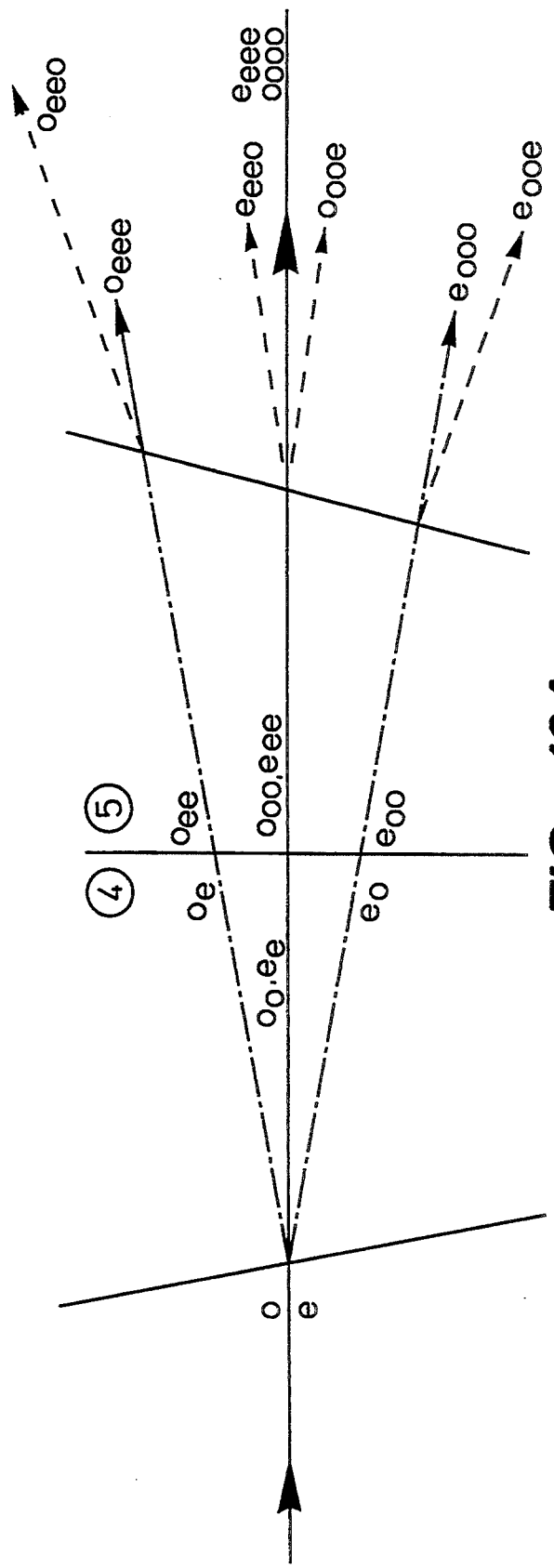
FIG. 18A, 18B are schematic views of light rays passing in the forward and reverse directions to illustrate the operation of the device of FIGS. 17A, 17B.
Figure 18B:
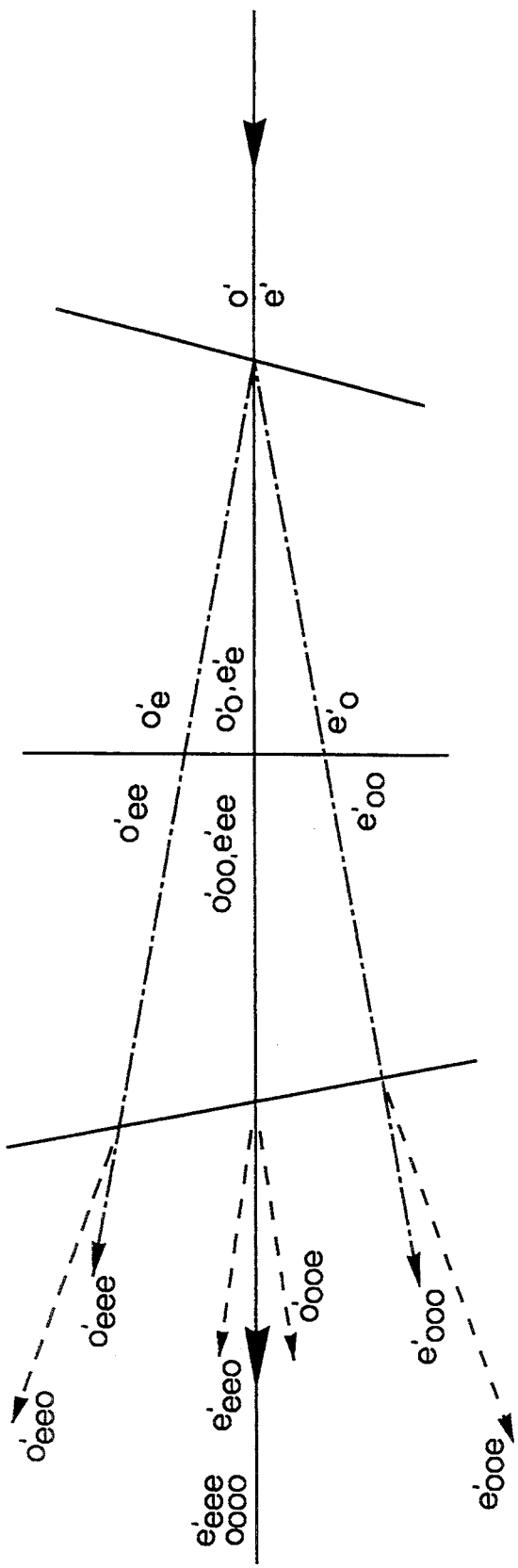

FIGS. 18A, 18B are schematic views of light rays passing in the forward and reverse directions to illustrate the operation of the device of FIG. 17A, 17B. The device of FIG. 17A differs from that of FIG. 15A in the orientation of the third and fourth wedge. While the change of orientation of such wedges does enable the device of FIG. 17A to achieve isolation as illustrated in FIGS. 18A, 18B, the device of FIG. 17A also introduces optical path length difference which is undesirable. This is evident from FIG. 18A. Thus the two rays which emerge parallel to the axis are $O_{ooo}$ and $e_{eee}$. These two rays are focused by lens 38 onto the end of fiber 34 in FIG. 17A and are synthesized. In other words, one of the two rays has experienced refractions through the four wedges all in accordance with the index $n_o$ and the remaining ray has experienced refractions in the four wedges all in accordance with index $n_e$. Each of the four wedges therefore introduces an optical path length difference which is cumulative with the other three and the four path length differences add rather than cancel which aggravates the problem.

FIG. 19A is a side view of an array of elements constituting a polarization preserving optical isolator device to illustrate still another embodiment of the invention. FIG. 19B are cross-sectional views of six elements of FIG. 19A, where the cross-sectional views are arranged side-by-side in the same order as in the array of FIG. 19A in the forward direction.

Figure 20A:
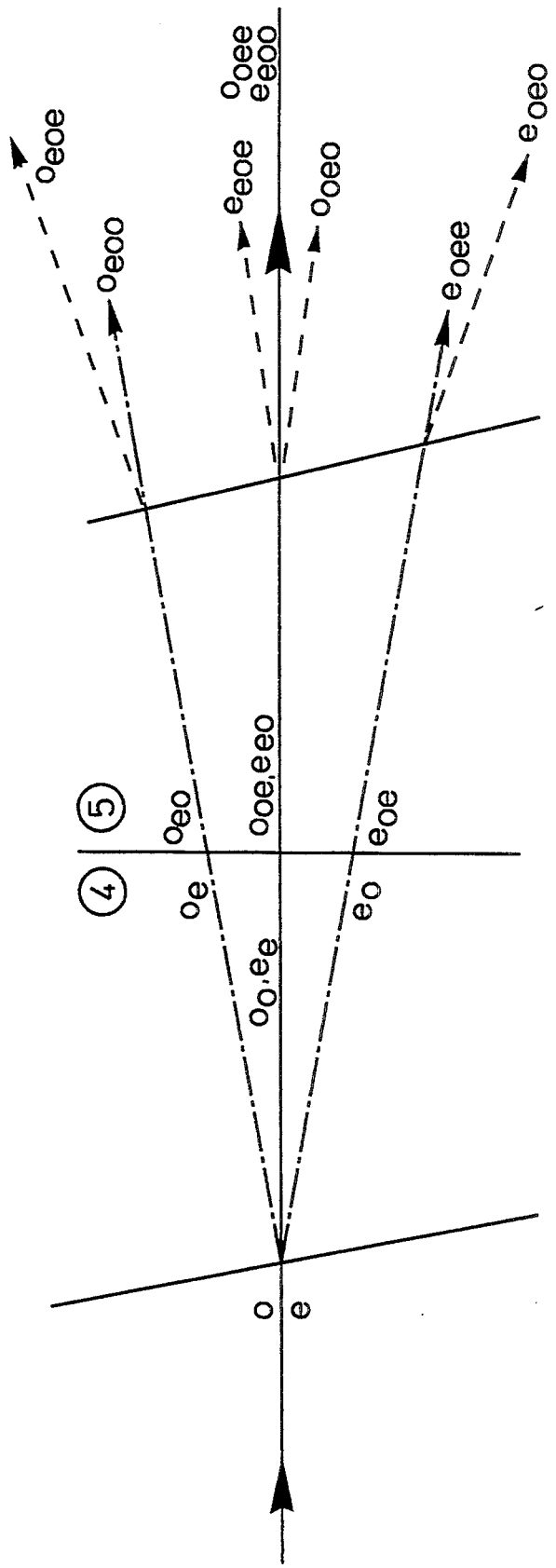
FIGS. 20A, 20B are schematic views of light rays passing in the forward and reverse directions to illustrate the operation of the device of FIGS. 19A, 19B.
Figure 20B:
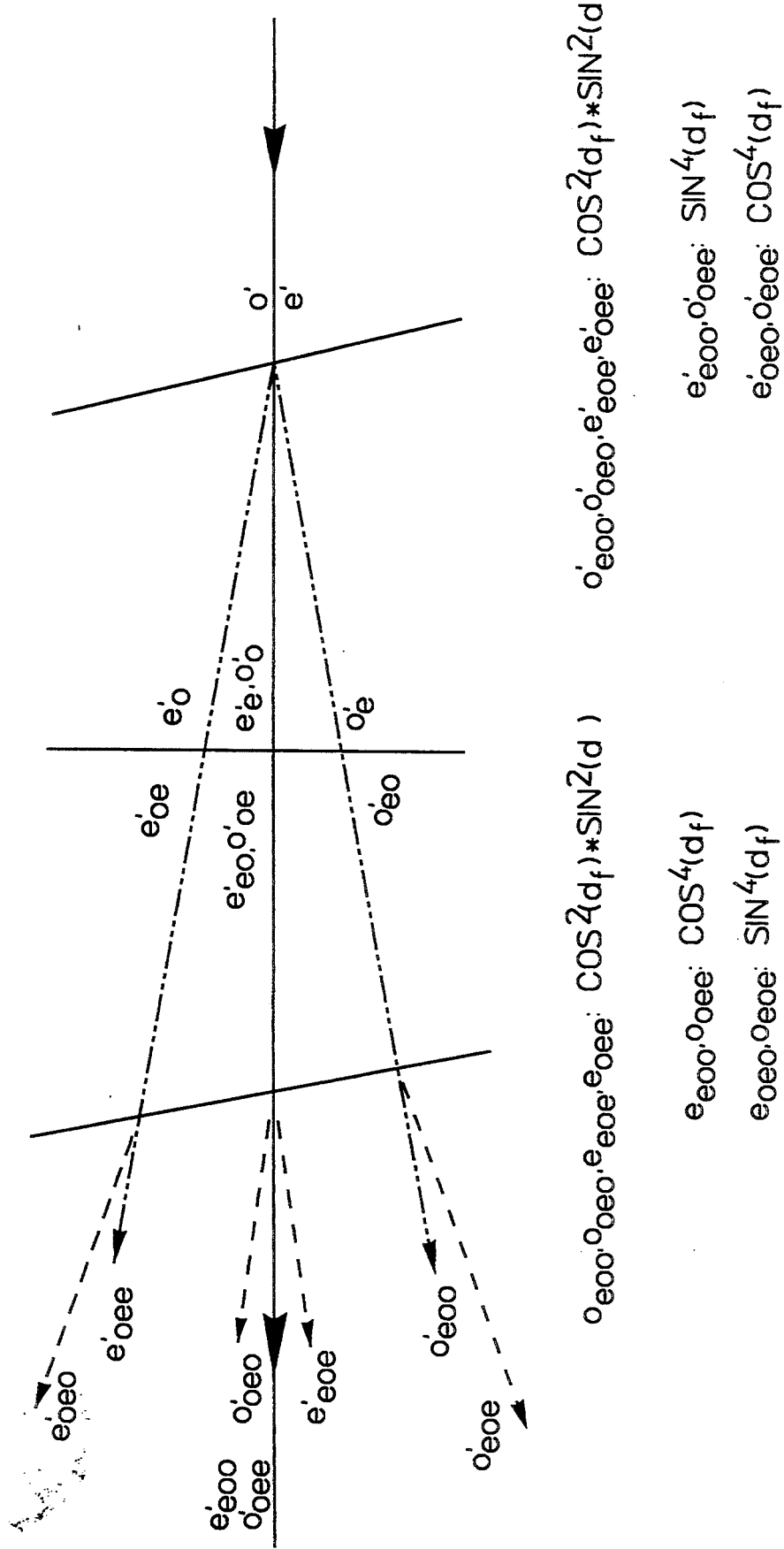

FIGS. 20A, 20B are schematic views of light rays passing in the forward and reverse directions to illustrate the operation of the device of FIGS. 19A, 19B. As shown in FIGS. 20A, 20B, the device of FIGS. 19A, 19B achieves isolation. Furthermore, the two rays which emerge parallel to the axis in the forward direction are $O_{oee}$ and $e_{eoo}$. This means that the two rays have each experienced two refractions in accordance with the index $n_o$ and two refractions according to the index $n_e$. Thus if the device of FIG. 19A, 19B is modified to include two or more pairs of birefringent plates where each pair of members has substantially the same average thickness, and where the optical axes and the non-reciprocal elements are oriented so that the two rays in the forward direction experience refractions in the $n_e$ direction for the same number of times as the refraction in the $n_o$ direction, then there would be substantially no optical path length difference between the two rays that emerge parallel to the axis in the forward direction. The orientations of the elements shown in FIGS. 19A, 19b will cause the polarization states and degree of polarization of the incoming light to be preserved as well as provide isolation. While this being the case, it will be understood that other orientations will also function to provide the same results. Thus the orientations of the two Faraday rotators and of the four tapered birefringent plates may take on the values of any one of the eight rows in Table 4 below.

TABLE 4

| Faraday Rotation | | Directions of the Tapered Angle | | | |
|---|---|---|---|---|---|
| first | second | first | second | third | fourth |
| −45 | −45 | 0.0 | 135 | 45 | 180 |
| −45 | −45 | 0.0 | 135 | 225 | 0 |
| +45 | +45 | 0.0 | 225 | 135 | 0 |
| +45 | +45 | 0.0 | 225 | 315 | 180 |
| −45 | +45 | 0.0 | 135 | 45 | 270 |
| −45 | +45 | 0.0 | 135 | 225 | 90 |
| +45 | −45 | 0.0 | 225 | 135 | 270 |
| +45 | −45 | 0.0 | 225 | 315 | 90 |

Table 4 above shows the orientations of the tapering direction for the first, second, third & fourth tapered birefringent plate with respect to the first plate. In the table, the first non-reciprocal element (labelled Faraday rotation) is situated between the first and second tapered birefringent plates and the second non-reciprocal element is situated between the third and fourth tapered birefringent plates. The direction of the tapered angle of each plate is substantially parallel to the $n_e$ optical axis of the plate.

The above described details of implementation and method are merely illustrative of the invention. The scope of the invention is limited only by the appended claims.

We claim:

1. In an optical isolator that passes forward directed light with greater intensity than reverse directed light and that includes a first rotational element positioned between a first walk off crystal and a second walk off crystal, an improvement comprising:

at least a third walk off crystal in optical communication with the second walk off crystal; the third walk off crystal having a third optical axis orientation relative to the second walk off crystal and having a third selected physical dimension along an axis of light passage;

at least a second rotational element in optical communication with the third walk off crystal; the second rotational element having a second optical rotation;

at least a fourth walk off crystal in optical communication with the second rotational means; the fourth walk off crystal having a fourth optical axis orientation relative to the third walk off crystal and having a fourth selected physical dimension along an axis of light passage; the third and fourth optical axis orientation, the third and fourth selected physical dimensions, and the second optical rotation all being such that the polarization state and the degree of polarization are preserved for forward directed light.

2. An optical nonreciprocal device for passing light in a forward direction from a first point to a second point and for reducing light passing in a reverse direction from the second point to the first point, said device comprising:

at least two walk off crystal members arranged in a linear array for separating light into ordinary and extraordinary rays; and at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;

said device including a sequence of a first, second, third and fourth walk off crystal member placed in said sequence between the first and second points, wherein the first and fourth members have substantially the same thickness and the second and third members each has a thickness which is substantially 1.4142 times that of the first and fourth members, wherein the walk off direction of the fourth member is substantially opposite to that of the first member, and the walk off directions of the second and third members are oriented about 135, 45 degrees or 45, 135 degrees respectively clockwise relative to that of the first member when viewed along the forward direction, and wherein said device comprises a first and a second non-reciprocal element for rotating the polarization of light traveling in the forward direction by substantially 45 degrees counterclockwise when viewed in the forward direction, said first element situated between the first and second members, and the second element situated between the third and fourth members.

3. An optical nonreciprocal device for passing light in a forward direction from a first point to a second point and for reducing light passing in a reverse direction from the second point to the first point, said device comprising:

at least two walk off crystal members arranged in a linear array for separating light into ordinary and extraordinary rays; and at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;

said device including a sequence of a first, second, third and fourth walk off crystal member placed in said sequence between the first and second points, wherein the first and fourth members have substantially the same thickness and the second and third members each has a thickness which is substantially 1.4142 times that of the first and fourth members, wherein the walk off direction of the fourth member is substantially parallel to that of the first member;

said device comprising a first and a second non-reciprocal element for rotating the polarization of light traveling in the forward direction by substantially 45 degrees counterclockwise when viewed in the forward direction, said first element situated between the first and second members, and the second element situated between the third and fourth members;

said device further comprising a pair of collimating lenses located between the two non-reciprocal elements, and wherein the walk off directions of the second and third members are oriented at about the following angles clockwise relative to that of the first member when viewed in the forward direction:

(a) about 315, 225 degrees or 225, 315 degrees respectively when the lenses are between the first and second members;

(b) about 135, 225 degrees or 45, 315 degrees respectively when the lenses are between the second and the third members;

(c) about 135, 45 degrees or 45, 135 degrees respectively when the lenses are between the third and fourth members.

4. An optical nonreciprocal device for passing light in a forward direction from a first point to a second point and for reducing light passing in a reverse direction from the second point to the first point, said device comprising:

at least two walk off crystal members arranged in a linear array for separating light into ordinary and extraordinary rays; and at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;

said device including a sequence of a first, second, third and fourth walk off crystal member placed in said sequence between the first and second points, wherein the first and fourth members have substantially the same thickness and the second and third members each has a thickness which is substantially 1.4142 times that of the first and fourth members, wherein the walk off direction of the fourth member is substantially opposite to that of the first member, and the walk off directions of the second and third members are oriented about 225, 315 degrees or 315, 225 degrees respectively clockwise relative to that of the first member when viewed along the forward direction, and wherein said device comprises a first and a second non-reciprocal element for rotating the polarization of light traveling in the forward direction by substantially 45 degrees clockwise when viewed in the forward direction, said first element situated between the first and second members, and the second element situated between the third and fourth members.

5. An optical nonreciprocal device for passing light in a forward direction from a first point to a second point and for reducing light passing in a reverse direction from the second point to the first point, said device comprising:

at least two walk off crystal members arranged in a linear array for separating light into ordinary and extraordinary rays; and at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;

said device including a sequence of a first, second, third and fourth walk off crystal member placed in said sequence between the first and second points, wherein the first and fourth members have substantially the same thickness and the second and third members each has a thickness which is substantially 1.4142 times that of the first and fourth members, wherein the walk off direction of the fourth member is substantially parallel to that of the first member;

said device comprising a first and a second non-reciprocal element for rotating the polarization of light traveling in the forward direction by substantially 45 degrees clockwise when viewed in the forward direction, said first element situated between the first and second members, and the second element situated between the third and fourth members;

said device further comprising a pair of collimating lenses located between the two non-reciprocal elements, and wherein the walk off directions of the second and third members are oriented at about the following angles clockwise relative to that of the first member when viewed in the forward direction:

(a) about 45, 135 degrees or 135, 45 degrees respectively when the lenses are between the first and second members;

(b) about 225, 135 degrees or 315, 45 degrees respectively when the lenses are between the second and the third members;

(c) about 225, 315 degrees or 315, 225 degrees respectively when the lenses are between the third and fourth members.

6. An optical nonreciprocal device for passing light in a forward direction from a first point to a second point and for reducing light passing in a reverse direction from the second point to the first point, said device comprising:

at least two walk off crystal members arranged in a linear array for separating light into ordinary and extraordinary rays; and at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;

said device including a sequence of a first, second, third and fourth walk off crystal member placed in said sequence between the first and second points, wherein the first and third members have substantially the same thickness and the second and fourth members each has a thickness which is substantially 1.4142 times that of the first and third members;

wherein the walk off direction of the third member is substantially opposite to that of the first member;

said device comprising a first, second and third non-reciprocal element for rotating the polarization of light traveling in the forward direction by substantially 45 degrees counterclockwise, 45 degrees counterclockwise and 45 degrees clockwise respectively when viewed in the forward direction, said first element situated between the first and second members, said second element situated between the second and third members and said third element situated between the third and fourth members;

wherein the walk off directions of the second and fourth members are oriented about 135, 45 or 45, 135 degrees clockwise relative to that of the first member when viewed along the forward direction.

7. An optical nonreciprocal device for passing light in a forward direction from a first point to a second point and for reducing light passing in a reverse direction from the second point to the first point, said device comprising:

at least two walk off crystal members arranged in a linear array for separating light into ordinary and extraordinary rays; and at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;

said device including a sequence of a first, second, third and fourth walk off crystal member placed in said sequence between the first and second points, wherein the first and third members have substantially the same thickness and the second and fourth members each has a thickness which is substantially 1.4142 times that of the first and third members;

said device comprising a first, second and third non-reciprocal element for rotating the polarization of light traveling in the forward direction by substantially 45 degrees counterclockwise, 45 degrees counterclockwise and 45 degrees clockwise respectively when viewed in the forward direction, said first element situated between the first and second members, said second element situated between the second and third members and said third element situated between the third and fourth members;

said device further comprising a pair of collimating lenses located between the first and third non-reciprocal elements, and wherein the walk off directions of the second, third and fourth members are oriented at about the following angles clockwise relative to that of the first member when viewed in the forward direction:
(a) about 315, 0, 225 degrees or 225, 0, 315 degrees respectively when the lenses are between the first and second members;
(b) about 135, 0, 225 degrees or 45, 0, 315 degrees respectively when the lenses are between the second and the third members;
(c) about 135, 180, 225 degrees or 45, 180, 315 degrees respectively when the lenses are between the third and fourth members.

8. An optical nonreciprocal device for passing light in a forward direction from a first point to a second point and for reducing light passing in a reverse direction from the second point to the first point, said device comprising:
at least two walk off crystal members arranged in a linear array for separating light into ordinary and extraordinary rays; and
at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;
said device including a sequence of a first, second, third and fourth walk off crystal member placed in said sequence between the first and second points, wherein the first and third members have substantially the same thickness and the second and fourth members each has a thickness which is substantially 1.4142 times that of the first and third members;
wherein the walk off direction of the third member is substantially opposite to that of the first member;
said device comprising a first, second and third non-reciprocal element for rotating the polarization of light traveling in the forward direction by substantially 45 degrees clockwise, 45 degrees clockwise and 45 degrees counterclockwise respectively when viewed in the forward direction, said first element situated between the first and second members, said second element situated between the second and third members and said third element situated between the third and fourth members;
wherein the walk off directions of the second and fourth members are oriented about 225, 315 or 315, 225 degrees clockwise relative to that of the first member when viewed along the forward direction.

9. An optical nonreciprocal device for passing light in a forward direction from a first point to a second point and for reducing light passing in a reverse direction from the second point to the first point, said device comprising:
at least two walk off crystal members arranged in a linear array for separating light into ordinary and extraordinary rays; and
at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;
said device including a sequence of a first, second, third and fourth walk off crystal member placed in said sequence between the first and second points, wherein the first and third members have substantially the same thickness and the second and fourth members each has a thickness which is substantially 1.4142 times that of the first and third members;
said device comprising a first, second and third non-reciprocal element for rotating the polarization of light traveling in the forward direction by substantially 45 degrees clockwise, 45 degrees clockwise and 45 degrees counterclockwise respectively when viewed in the forward direction, said first element situated between the first and second members, said second element situated between the second and third members and said third element situated between the third and fourth members;
said device further comprising a pair of collimating lenses located between the first and third non-reciprocal elements, and wherein the walk off directions of the second, third and fourth members are oriented at about the following angles clockwise relative to that of the first member when viewed in the forward direction:
(a) about 45, 0, 135 degrees or 135, 0, 45 degrees respectively when the lenses are between the first and second members;
(b) about 225, 0, 135 degrees or 315, 0, 45 degrees respectively when the lenses are between the second and the third members;
(c) about 225, 180, 135 degrees or 315, 180, 45 degrees respectively when the lenses are between the third and fourth members.

10. An optical nonreciprocal device for passing light in a forward direction from a first point to a second point an for reducing light passing in a reverse direction from the second point to the first point, said device comprising:

at least two walk off crystal members arranged in a linear array for separating light into ordinary and extraordinary rays; and at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;

said device including a sequence of a first, second, third and fourth walk off crystal member placed in said sequence between the first and second points, wherein the first and third members have substantially the same thickness and the second and fourth members each has a thickness which is substantially 1/1.4142 times that of the first and third members;

said device comprising a first, second and third non-reciprocal element for rotating the polarization of light traveling in the forward direction by substantially 45 degrees counterclockwise, 45 degrees clockwise and 45 degrees clockwise respectively when viewed in the forward direction, said first element situated between the first and second members, said second element situated between the second and third members and said third element situated between the third and fourth members;

wherein the walk off directions of the second, third and fourth members are oriented about 135, 90, 315 or 45, 270, 225 degrees clockwise relative to that of the first member when viewed along the forward direction.

11. An optical nonreciprocal device for passing light in a forward direction from a first point to a second point and for reducing light passing in a reverse direction from the second point to the first point, said device comprising:

at least two walk off crystal members arranged in a linear array for separating light into ordinary and extraordinary rays; and at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;

said device including a sequence of a first, second, third and fourth walk off crystal member placed in said sequence between the first and second points, wherein the first and third members have substantially the same thickness and the second and fourth members each has a thickness which is substantially 1/1.4142 times that of the first and third members;

said device comprising a first, second and third non-reciprocal element for rotating the polarization of light traveling in the forward direction by substantially 45 degrees counterclockwise, 45 degrees clockwise and 45 degrees clockwise respectively when viewed in the forward direction, said first element situated between the first and second members, said second element situated between the second and third members and said third element situated between the third and fourth members;

said device further comprising a pair of collimating lenses located between the first and third non-reciprocal elements, and wherein the walk off directions of the second, third and fourth members are oriented at about the following angles clockwise relative to that of the first member when viewed in the forward direction:

(a) about 315, 270, 135 degrees or 225, 90, 45 degrees respectively when the lenses are between the first and second members;

(b) about 135, 270, 135 degrees or 45, 90, 45 degrees respectively when the lenses are between the second and the third members;

(c) about 135, 90, 135 degrees or 45, 270, 45 degrees respectively when the lenses are between the third and fourth members.

12. An optical nonreciprocal device for passing light in a forward direction from a first point to a second point and for reducing light passing in a reverse direction from the second point to the first point, said device comprising:

at least two walk off crystal members arranged in a linear array for separating light into ordinary and extraordinary rays; and at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;

said device including a sequence of a first, second, third and fourth walk off crystal member placed in said sequence between the first and second points, wherein the first and third members have substantially the same thickness and the second and fourth members each has a thickness which is substantially 1/1.4142 times that of the first and third members;

said device comprising a first, second and third nonreciprocal element for rotating the polarization of light traveling in the forward direction by substantially 45 degrees clockwise, 45 degrees counterclockwise and 45 degrees counterclockwise respectively when viewed in the forward direction, said first element situated between the first and second members, said second element situated between the second and third members and said third element situated between the third and fourth members;

wherein the walk off directions of the second, third and fourth members are oriented about 225, 270, 45 or 315, 90, 135 degrees clockwise relative to that of the first member when viewed along the forward direction.

13. An optical nonreciprocal device for passing light in a forward direction from a first point to a second point and for reducing light passing in a reverse direction from the second point to the first point, said device comprising:

at least two walk off crystal members arranged in a linear array for separating light into ordinary and extraordinary rays; and at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;

said device including a sequence of a first, second, third and fourth walk off crystal member placed in said sequence between the first and second points, wherein the first and third members have substantially the same thickness and the second and fourth members each has a thickness which is substantially 1/1.4142 times that of the first and third members;

said device comprising a first, second and third nonreciprocal element for rotating the polarization of light traveling in the forward direction by substantially 45 degrees clockwise, 45 degrees counterclockwise and 45 degrees counterclockwise respectively when viewed in the forward direction, said first element situated between the first and second members, said second element situated between the second and third members and said third element situated between the third and fourth members;

said device further comprising a pair of collimating lenses located between the first and third nonreciprocal elements, and wherein the walk off directions of the second, third and fourth members are oriented at about the following angles clockwise relative to that of the first member when viewed in the forward direction:

(a) about 45, 90, 225 degrees or 135, 270, 315 degrees respectively when the lenses are between the first and second members;

(b) about 225, 90, 225 degrees or 315, 270, 315 degrees respectively when the lenses are between the second and the third members;

(c) about 225, 270, 225 degrees or 315, 90, 315 degrees respectively when the lenses are between the third and fourth members.

14. An optical nonreciprocal device for passing light in a forward direction from a first point to a second point and for reducing light passing in a reverse direction from the second point to the first point, said device comprising:

at least two walk off crystal members arranged in a linear array for separating light into ordinary and extraordinary rays; and at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;

said device including a sequence of a first, second and third walk off crystal member placed in said sequence between the first and second points, wherein the second and third members have substantially the same thickness and the first member has a thickness substantially 1.4142 times that of the second and third members, wherein the walk off directions of the second and third members are oriented about 135, 45 degrees or 45, 135 degrees respectively clockwise relative to that of the first member when viewed along the forward direction, and wherein said device comprises a non-reciprocal element for rotating the polarization of light traveling in the forward direction by substantially 45 degrees counterclockwise when viewed in the forward direction, said first element situated between the first and second members, said device further comprising a birefringent plate said plate being of a thickness and orientation such that the plate introduces an optical path length difference which compensates for the optical path length difference between the first and second rays in the forward direction when they reach the plate.

15. An optical nonreciprocal device for passing light in a forward direction from a first point to a second point and for reducing light passing in a reverse direction from the second point to the first point, said device comprising:

at least two walk off crystal members arranged in a linear array for separating light into ordinary and extraordinary rays; and at least one non-reciprocal rotation element interposed between two adjacent walk off crystal members, wherein rotations of the elements and the dimensions and orientations of the crystal members are such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction;

said device including a sequence of a first, second and third walk off crystal member placed in said sequence between the first and second points, wherein the second and third members have substantially the same thickness and the first member has a thickness substantially 1.4142 times that of the second and third members, wherein the walk off directions of the second and third members are oriented about 225, 315 degrees or 315, 225 degrees respectively clockwise relative to that of the first member when viewed along the forward direction, and wherein said device comprises a non-reciprocal element for rotating the polarization of light traveling in the forward direction by substantially 45 degrees clockwise when viewed in the forward direction, said first element situated between the first and second members, said device further comprising a birefringent plate, said plate being of a thickness and orientation such that the plate introduces an optical path length difference which compensates for the optical path length difference between the first and second rays in the forward direction when they reach the plate.

16. An optical nonreciprocal device for passing light in a forward direction from a first point to a second point and for reducing light passing in a reverse direction from the second point to the first point, said device comprising:

a first, second, and third birefringent plate arranged in a sequence and a linear array between the first and second points with the first or second plate between the other two plates for separating light into ordinary and extraordinary rays; and a non-reciprocal rotation element between the first and second plates for rotating the polarization of the light in the forward and reverse directions by substantially 45 degrees, said first and second plates being tapered, said three plates each having an optical axis ne in the plane of the plate, wherein the optical axis of the second plate is rotated by substantially 45 degrees with respect to that of the first plate and the optical axis of the third plate is substantially orthogonal to that of the second plate, and wherein the third plate has a thickness which is substantially equal to the sum of the average thicknesses of the first and second plates such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction.

17. An optical nonreciprocal device for passing light in a forward direction from a first point to a second point and for reducing light passing in a reverse direction from the second point to the first point, said device comprising:

a first and second tapered birefringent plates between the first and second points, said first plate closer to the first point than the second plate, for separating light into ordinary and extraordinary rays, said two plates being tapered and having substantially the same average thicknesses and have optical axes $n_o$, $n_e$ in the plane of the plate; and a non-reciprocal rotation element between the first and second plates for rotating the polarization of the light in the forward and reverse directions by substantially 45 degrees counterclockwise when viewed in the forward direction, wherein the optical axis $n_e$ of the second plate is rotated by substantially 45 degrees clockwise relative to that of the first plate when viewed in the forward direction such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction.

18. The device of claim 17, further comprising isotropic means placed between the second plate and the second point for coupling light to the second point in the forward direction.

19. An optical nonreciprocal device for passing light in a forward direction from a first point to a second point and for reducing light passing in a reverse direction from the second point to the first point, said device comprising:

a first and second tapered birefringent plates between the first and second points, said first plate closer to the first point than the second plate, for separating light into ordinary and extraordinary rays, said two plates being tapered and having substantially the same average thicknesses and have optical axes $n_o$, $n_e$ in the plane of the plate; and a non-reciprocal rotation element between the first and second plates for rotating the polarization of the light in the forward and reverse directions by substantially 45 degrees clockwise when viewed in the forward direction, wherein the optical axis $n_e$ of the second plate is rotated by substantially 45 degrees counterclockwise relative to that of the first plate when viewed in the forward direction such that light in both the forward and reverse directions is separated into a first and a second ray of substantially linear polarizations wherein the polarizations of the two rays are substantially orthogonal to each other, wherein in the forward direction the two rays are synthesized when they arrive at the second point, and in the reverse direction the two rays substantially do not superpose each other at the first point, so that light passing in the reverse direction is reduced, and wherein there is substantially no optical path length difference between the two rays in the forward direction, thereby preserving the polarization state and the degree of polarization of the light in the forward direction.

20. The device of claim 19, further comprising isotropic means placed between the second plate and the second point for coupling light to the second point in the forward direction.

* * * * *

UNITED STATES PATENT AND TRADEMARK OFFICE
CERTIFICATE OF CORRECTION

PATENT NO : 5,446,578

DATED : August 29, 1995

INVENTOR(S): Chang et al.

It is certified that error appears in the above-identified patent and that said Letters Patent is hereby corrected as shown below:

Column 2, line 1, "from mission," should read -- transmission --;

Column 2, line 5, "beam" should read -- laser beam --;

Column 9, line 7, "07/222,517" should read -- 07/222,597 --.

Signed and Sealed this

Tenth Day of November 1998

Attest:

BRUCE LEHMAN

Attesting Officer

Commissioner of Patents and Trademarks